US011556964B2

(12) United States Patent
Chalasani et al.

(10) Patent No.: US 11,556,964 B2
(45) Date of Patent: *Jan. 17, 2023

(54) METHODS, SYSTEMS, AND DEVICES FOR COUNTERFACTUAL-BASED INCREMENTALITY MEASUREMENT IN DIGITAL AD-BIDDING PLATFORM

(71) Applicant: MediaMath, Inc., New York, NY (US)

(72) Inventors: Prasad Chalasani, New York, NY (US); Ari Buchalter, New York, NY (US); Ezra Winston, New York, NY (US); Jaynth Thiagarajan, New York, NY (US)

(73) Assignee: MediaMath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,974

(22) Filed: Sep. 27, 2021

(65) Prior Publication Data
US 2022/0084075 A1    Mar. 17, 2022

Related U.S. Application Data

(63) Continuation of application No. 17/188,469, filed on Mar. 1, 2021, now Pat. No. 11,170,413, which is a
(Continued)

(51) Int. Cl.
G06Q 30/02 (2012.01)
G06N 7/00 (2006.01)

(52) U.S. Cl.
CPC ......... G06Q 30/0275 (2013.01); G06N 7/005 (2013.01); G06Q 30/0243 (2013.01); G06Q 30/0277 (2013.01)

(58) Field of Classification Search
CPC .......... G06Q 30/0275; G06Q 30/0243; G06Q 30/0277; G06N 7/005
(Continued)

(56) References Cited

U.S. PATENT DOCUMENTS 5,923,902 A    7/1999  Inagaki
5,983,227 A   11/1999  Nazem et al.
(Continued)

FOREIGN PATENT DOCUMENTS

JP    2007535687    12/2007
KR    20020028238     4/2002
(Continued)

OTHER PUBLICATIONS

Google, A Revolution in Measuring Ad Effectiveness: Knowing Who Would Have Been Exposed, 2015 (Year: 2015).*
(Continued)

*Primary Examiner* — Tarek Elchanti
(74) *Attorney, Agent, or Firm* — Knobbe Martens Olson & Bear, LLP

(57) ABSTRACT

A digital ad-buying platform uses counterfactual-based incrementality measurement by implementing randomization and/or a correction for auction win bias to avoid the need to identify counterfactual winner types in the control group. This approach can estimate impact at the individual consumer level. Confidence levels can be determined using Gibbs sampling in the context of causal analysis in the presence of non-compliance.

20 Claims, 12 Drawing Sheets

Related U.S. Application Data continuation of application No. 16/425,309, filed on May 29, 2019, now Pat. No. 10,977,697, which is a continuation of application No. 15/667,507, filed on Aug. 2, 2017, now Pat. No. 10,467,659.

(60) Provisional application No. 62/491,522, filed on Apr. 28, 2017, provisional application No. 62/370,614, filed on Aug. 3, 2016.

(58) Field of Classification Search
USPC ..................................................... 705/14.71
See application file for complete search history.

(56) References Cited

U.S. PATENT DOCUMENTS

| | | |
|---|---|---|
| 6,269,361 B1 | 7/2001 | Davis et al. |
| 6,285,983 B1 | 9/2001 | Jenkins |
| 6,327,574 B1 | 12/2001 | Kramer et al. |
| 6,430,539 B1 | 8/2002 | Lazarus et al. |
| 6,766,327 B2 | 7/2004 | Morgan et al. |
| 6,938,022 B1 | 8/2005 | Singhal |
| 6,941,376 B2 | 9/2005 | Mitchell et al. |
| 6,974,078 B1 | 12/2005 | Simon |
| 7,013,290 B2 | 3/2006 | Ananian |
| 7,069,256 B1 | 6/2006 | Campos |
| 7,139,723 B2 | 11/2006 | Conkwright et al. |
| 7,146,329 B2 | 12/2006 | Conkwright et al. |
| 7,197,472 B2 | 3/2007 | Conkwright et al. |
| 7,197,568 B2 | 3/2007 | Bou et al. |
| 7,203,909 B1 | 4/2007 | Horvitz |
| 7,219,078 B2 | 5/2007 | Lamont et al. |
| 7,236,941 B2 | 6/2007 | Conkwright et al. |
| 7,257,546 B2 | 8/2007 | Ebrahimi et al. |
| 7,523,087 B1 | 4/2009 | Agarwal et al. |
| 7,630,986 B1 | 12/2009 | Herz et al. |
| 7,685,232 B2 | 3/2010 | Gibbs et al. |
| 7,792,697 B2 | 9/2010 | Bhagchandani et al. |
| 7,805,332 B2 | 9/2010 | Wilson |
| 7,840,438 B2 | 11/2010 | Carson et al. |
| 7,848,950 B2 | 12/2010 | Herman et al. |
| 7,860,743 B2 | 12/2010 | Stevens |
| 8,001,004 B2 | 8/2011 | Protheroe et al. |
| 8,086,697 B2 | 12/2011 | Goulden et al. |
| 8,108,254 B2 | 1/2012 | Lin et al. |
| 8,117,067 B2 | 2/2012 | Ketchum |
| 8,117,199 B2 | 2/2012 | Ghani et al. |
| 8,160,977 B2 | 4/2012 | Poulin |
| 8,175,950 B1 | 5/2012 | Grebeck et al. |
| 8,255,285 B1 | 8/2012 | Peretz et al. |
| 8,255,489 B2 | 8/2012 | Agergan et al. |
| 8,375,046 B2 | 2/2013 | Dettinger et al. |
| 8,392,246 B2 | 3/2013 | Coladonato et al. |
| 8,527,342 B2 | 9/2013 | Feuerstein et al. |
| 8,548,909 B1 | 10/2013 | Snow et al. |
| 8,688,522 B2 | 4/2014 | Gern et al. |
| 8,782,249 B1 | 7/2014 | Hood |
| 8,972,530 B2 | 3/2015 | Agergan et al. |
| 9,047,612 B2 | 6/2015 | Anderson et al. |
| 9,076,166 B1 | 7/2015 | Peretz et al. |
| 9,135,655 B2 | 9/2015 | Buchalter et al. |
| 9,497,496 B1 | 11/2016 | Corley et al. |
| 10,191,972 B2 | 1/2019 | Maher et al. |
| 10,223,703 B2 | 3/2019 | Buchalter et al. |
| 10,332,156 B2 | 6/2019 | Buchalter et al. |
| 10,354,276 B2 | 7/2019 | Schobeiri et al. |
| 10,467,659 B2 | 11/2019 | Chalasani et al. |
| 10,592,910 B2 | 3/2020 | Buchalter |
| 10,628,859 B2 | 4/2020 | Buchalter et al. |
| 10,636,060 B2 | 4/2020 | Buchalter et al. |
| 2001/0037361 A1 | 11/2001 | Croy |
| 2001/0049620 A1 | 12/2001 | Blasko |
| 2001/0053995 A1 | 12/2001 | Nishimoto |
| 2002/0052825 A1 | 5/2002 | Bensemana |
| 2002/0055880 A1 | 5/2002 | Unold et al. |
| 2002/0059369 A1 | 5/2002 | Kern et al. |
| 2002/0065797 A1 | 5/2002 | Meidan et al. |
| 2002/0087573 A1 | 7/2002 | Reuning et al. |
| 2002/0087967 A1 | 7/2002 | Conkwright et al. |
| 2002/0103698 A1 | 8/2002 | Cantrell |
| 2002/0116491 A1 | 8/2002 | Boyd et al. |
| 2002/0133490 A1 | 9/2002 | Conkwright et al. |
| 2002/0188508 A1 | 12/2002 | Lee et al. |
| 2002/0194434 A1 | 12/2002 | Kurasugi |
| 2003/0018550 A1 | 1/2003 | Rotman et al. |
| 2003/0023489 A1 | 1/2003 | McGuire et al. |
| 2003/0033202 A1 | 2/2003 | Ogawa et al. |
| 2003/0101454 A1 | 5/2003 | Ozer et al. |
| 2003/0135464 A1 | 7/2003 | Mourad et al. |
| 2003/0149622 A1 | 8/2003 | Singh et al. |
| 2003/0208754 A1 | 11/2003 | Sridhar et al. |
| 2004/0054589 A1 | 3/2004 | Nicholas et al. |
| 2004/0073553 A1 | 4/2004 | Brown et al. |
| 2004/0083133 A1 | 4/2004 | Nicholas et al. |
| 2004/0123247 A1 | 6/2004 | Wachen et al. |
| 2004/0215501 A1 | 10/2004 | D'ornano |
| 2004/0225562 A1 | 11/2004 | Turner |
| 2005/0027593 A1 | 2/2005 | Wilson |
| 2005/0038700 A1 | 2/2005 | Doemling et al. |
| 2005/0080775 A1 | 4/2005 | Colledge et al. |
| 2005/0105513 A1 | 5/2005 | Sullivan et al. |
| 2005/0125289 A1 | 6/2005 | Beyda et al. |
| 2005/0144065 A1 | 6/2005 | Calabria et al. |
| 2005/0144072 A1 | 6/2005 | Perkowski et al. |
| 2005/0144073 A1 | 6/2005 | Morrisroe et al. |
| 2005/0159921 A1 | 7/2005 | Lourviere et al. |
| 2005/0171843 A1 | 8/2005 | Brazell et al. |
| 2005/0188400 A1 | 8/2005 | Topel |
| 2005/0197954 A1 | 9/2005 | Maitland et al. |
| 2005/0216339 A1 | 9/2005 | Brazell et al. |
| 2005/0235030 A1 | 10/2005 | Lauckhart et al. |
| 2005/0240354 A1 | 10/2005 | Mamou et al. |
| 2005/0251444 A1 | 11/2005 | Varian et al. |
| 2005/0261062 A1 | 11/2005 | Lewin |
| 2005/0273388 A1 | 12/2005 | Roetter |
| 2006/0026067 A1 | 2/2006 | Nicholas et al. |
| 2006/0031301 A1 | 2/2006 | Herz et al. |
| 2006/0041661 A1 | 2/2006 | Erikson et al. |
| 2006/0128469 A1 | 6/2006 | Willis et al. |
| 2006/0212350 A1 | 9/2006 | Ellis et al. |
| 2006/0224447 A1 | 10/2006 | Koningstein |
| 2006/0253323 A1 | 11/2006 | Phan et al. |
| 2007/0033105 A1 | 2/2007 | Collins et al. |
| 2007/0033269 A1 | 2/2007 | Atkinson et al. |
| 2007/0033532 A1 | 2/2007 | Lemelson |
| 2007/0050244 A1 | 3/2007 | Stevens |
| 2007/0061195 A1 | 3/2007 | Liu et al. |
| 2007/0118796 A1 | 5/2007 | Nazem et al. |
| 2007/0143171 A1 | 6/2007 | Boyd et al. |
| 2007/0150353 A1 | 6/2007 | Krassner et al. |
| 2007/0156524 A1 | 7/2007 | Grouf et al. |
| 2007/0157245 A1 | 7/2007 | Collins |
| 2007/0192356 A1 | 8/2007 | O'Kelley |
| 2007/0198350 A1 | 8/2007 | O'Kelley et al. |
| 2007/0214037 A1 | 9/2007 | Shubert et al. |
| 2007/0265923 A1 | 11/2007 | Krassner et al. |
| 2007/0271392 A1 | 11/2007 | Khopkar et al. |
| 2007/0271501 A1 | 11/2007 | Vasilik |
| 2007/0271511 A1 | 11/2007 | Khopkar et al. |
| 2008/0004954 A1 | 1/2008 | Horvitz |
| 2008/0021778 A1 | 1/2008 | Perkowski et al. |
| 2008/0052278 A1 | 2/2008 | Zlotin et al. |
| 2008/0052413 A1 | 2/2008 | Wang et al. |
| 2008/0086380 A1 | 4/2008 | Cohen et al. |
| 2008/0097832 A1 | 4/2008 | Lee et al. |
| 2008/0103799 A1 | 5/2008 | Domenikos et al. |
| 2008/0103800 A1 | 5/2008 | Domenikos et al. |
| 2008/0103895 A1 | 5/2008 | Burdick et al. |
| 2008/0109376 A1 | 5/2008 | Walsh et al. |
| 2008/0162574 A1 | 7/2008 | Gilbert |
| 2008/0189175 A1 | 8/2008 | Chan |
| 2008/0249855 A1 | 10/2008 | Collins et al. |
| 2008/0255922 A1 | 10/2008 | Feldman et al. |
| 2008/0256061 A1 | 10/2008 | Chang et al. |

(56) References Cited

U.S. PATENT DOCUMENTS

| | | |
|---|---|---|
| 2008/0262907 A1 | 10/2008 | Broady et al. |
| 2008/0275757 A1 | 11/2008 | Sharma et al. |
| 2008/0313027 A1 | 12/2008 | Jain et al. |
| 2009/0002852 A1 | 1/2009 | Wang |
| 2009/0012852 A1 | 1/2009 | O'Kelley et al. |
| 2009/0063250 A1 | 3/2009 | Burgess |
| 2009/0083145 A1 | 3/2009 | Lee |
| 2009/0098891 A1 | 4/2009 | Park et al. |
| 2009/0112629 A1 | 4/2009 | Leiper |
| 2009/0150362 A1 | 6/2009 | Evenhaim |
| 2009/0216619 A1 | 8/2009 | Tavernier |
| 2009/0228397 A1 | 9/2009 | Tawakol et al. |
| 2009/0327006 A1 | 12/2009 | Hansan |
| 2010/0023863 A1 | 1/2010 | Cohen-Martin |
| 2010/0042497 A1 | 2/2010 | Pritchard et al. |
| 2010/0049602 A1 | 2/2010 | Softky |
| 2010/0070322 A1 | 3/2010 | Lahaie et al. |
| 2010/0082402 A1 | 4/2010 | Kantak et al. |
| 2010/0082429 A1 | 4/2010 | Samdadiya et al. |
| 2010/0094758 A1 | 4/2010 | Chamberlain et al. |
| 2010/0100407 A1 | 4/2010 | Lin et al. |
| 2010/0114716 A1 | 5/2010 | Heilig et al. |
| 2010/0145763 A1 | 6/2010 | Swanson |
| 2010/0185516 A1 | 7/2010 | Swanson et al. |
| 2010/0191558 A1 | 7/2010 | Chickering et al. |
| 2010/0228634 A1 | 9/2010 | Ghosh et al. |
| 2010/0250332 A1 | 9/2010 | Ghosh et al. |
| 2010/0268603 A1 | 10/2010 | Nolet et al. |
| 2011/0035259 A1 | 2/2011 | Das et al. |
| 2011/0035287 A1 | 2/2011 | Fox |
| 2011/0055009 A1 | 3/2011 | Kiversis |
| 2011/0078143 A1 | 3/2011 | Aggarwal |
| 2011/0119125 A1 | 5/2011 | Javangula et al. |
| 2011/0145570 A1 | 6/2011 | Gressel et al. |
| 2011/0191714 A1 | 8/2011 | Ting et al. |
| 2011/0213659 A1 | 9/2011 | Fontoura et al. |
| 2011/0225037 A1 | 9/2011 | Tunca et al. |
| 2011/0231264 A1 | 9/2011 | Dilling et al. |
| 2011/0246298 A1 | 10/2011 | Williams et al. |
| 2011/0246310 A1 | 10/2011 | Buchalter et al. |
| 2011/0251875 A1 | 10/2011 | Cosman |
| 2011/0276389 A1 | 11/2011 | Kulkarni et al. |
| 2011/0313757 A1 | 12/2011 | Hoover et al. |
| 2012/0041816 A1 | 2/2012 | Buchalter |
| 2012/0129525 A1 | 5/2012 | Pazhyannur et al. |
| 2012/0215607 A1 | 8/2012 | Brereton, II et al. |
| 2012/0226560 A1 | 9/2012 | Chang et al. |
| 2012/0253928 A1 | 10/2012 | Jackson et al. |
| 2012/0323674 A1 | 12/2012 | Simmons et al. |
| 2013/0124316 A1 | 5/2013 | Kiversis |
| 2013/0124669 A1 | 5/2013 | Anderson et al. |
| 2013/0185039 A1 | 7/2013 | Tesauro et al. |
| 2013/0276009 A1 | 10/2013 | Ajitomi et al. |
| 2013/0346597 A1 | 12/2013 | Baumback et al. |
| 2014/0059343 A1 | 2/2014 | Mohajeri et al. |
| 2014/0082660 A1 | 3/2014 | Zhang et al. |
| 2014/0108139 A1 | 4/2014 | Weinstein |
| 2014/0143032 A1 | 5/2014 | Tomlin et al. |
| 2014/0201007 A1 | 7/2014 | Stack et al. |
| 2014/0222593 A1 | 8/2014 | Cosman |
| 2014/0279595 A1 | 9/2014 | Senaratna et al. |
| 2015/0051986 A1 | 2/2015 | Saifee et al. |
| 2015/0066793 A1 | 3/2015 | Brown |
| 2015/0193818 A1 | 7/2015 | Turner et al. |
| 2015/0242379 A1 | 8/2015 | Kuivinen et al. |
| 2015/0347353 A1 | 12/2015 | Turner et al. |
| 2015/0348141 A1 | 12/2015 | Parker et al. |
| 2016/0071168 A1 | 3/2016 | Buchalter et al. |
| 2016/0170567 A1 | 6/2016 | Hunter et al. |
| 2016/0316240 A1 | 10/2016 | Hirsch et al. |
| 2017/0052652 A1 | 2/2017 | Denton et al. |
| 2017/0330245 A1 | 11/2017 | Guermas et al. |
| 2018/0040032 A1 | 2/2018 | Chalasani et al. |
| 2018/0189843 A1 | 7/2018 | Kulkarni et al. |
| 2019/0205900 A1 | 7/2019 | Buchalter |
| 2019/0244257 A1 | 8/2019 | Goldman et al. |
| 2019/0340655 A1 | 11/2019 | Buchalter et al. |
| 2019/0347693 A1 | 11/2019 | Schobeiri et al. |
| 2019/0347697 A1 | 11/2019 | Chalasani et al. |
| 2019/0373077 A1 | 12/2019 | Lepore et al. |
| 2020/0160388 A1 | 5/2020 | Sabeg et al. |
| 2021/0090126 A1 | 3/2021 | Schobeiri et al. |
| 2021/0125223 A1 | 4/2021 | Schobeiri et al. |

FOREIGN PATENT DOCUMENTS

| | | | |
|---|---|---|---|
| KR | 20000030103 | 8/2008 | |
| WO | WO 2005/094175 | 10/2005 | |
| WO | WO 2009/078861 | 6/2009 | |
| WO | WO 2012/167209 | 12/2012 | |
| WO | WO 2014/074347 | 5/2014 | |
| WO | WO-2014074347 A1 * | 5/2014 | ......... G06Q 30/0273 |

OTHER PUBLICATIONS

"Online Customized Ads Move a Step Closer" printed Sep. 6, 2007.
"Yahoo New "SmartAds" Meld Brand and Direct Response Advertising" printed Sep. 6, 2007.
"Yahoo Smart Ads Demo Page" printed Sep. 6, 2007.
Abacus Selects MicroStrategy for Enhanced Marketing Campaign Reporting and Analysis, PRNewswire, Mar. 1, 2006, Retrieved from: http://prnewswire.com/news-releases/abacus-selects-microstrategy-for-enhanced-marketing-campaign-reporting-and-analysis-55192512.html (1 page).
Chen, M., et al., Mining changes in customer behavior in retail marketing, 2005, pp. 773-781, Expert Systems with Application, vol. 28, 9 pages.
Eric W. Tyree et al., Bankruptcy prediction models: probabilistic neural networks versus discriminant analysis and backpropagation neural networks, 1996.
EP Extended Search Report for Application No. 11713434.6 dated Feb. 24, 2014.
EP Supplementary Search Report for Application No. 11713434.6 dated Mar. 13, 2014.
Fu, A., et al., Privacy-Preserving Frequent Pattern Mining Across Private Databases, 2005, Proceeding of the Fifth IEEE International Conference on Data Mining, 4 Pages.
Google, A Revolution in Measuring Ad Effectiveness: Knowing Who Would have Been Exposed. 2015.
International Preliminary Report on Patentability dated Jan. 31, 2013 in PCT Application No. PCT/US2011/044386.
International Search Report and Written Opinion dated Jan. 27, 2012 in PCT Application No. PCT/US2011/030587.
International Search Report and Written Opinion dated Jan. 9, 2012 in PCT Application No. PCT/US2011/044386.
International Search Report and Written Opinion dated Feb. 24, 2014 in PCT Application No. PCT/US13/67330.
International Search Report and Written Opinion PCT/US11/43231 dated Jan. 19, 2012.
Privacy Preserving Data Mining Biography, Retrieved from: http://www.cs.umbc.edu/-kunliu1/research/privacy_review.html (12 pages).
Sammy, Ryan, Google's New Beta PPC Service Dubbed Remarketing, retrieved from internet: www.searchenginejournal.com/google%E2%80%99s-new-beta-ppc-service-dubbed-remarketing/18900/ (posted on Mar. 17, 2010).
Seufert, Eric, Measuring advertising incrementality using Ghost Ads, 2014 (Year: 2014).
University of Colorado Boulder Web Central, Expandable Content Sample, Apr. 4, 2016, (https://www.colorado.edu/webcentral/webexpress-features/site-building-snap/expandable-content-sample (Year: 2016).
Wikipedia contributors. "Conditional probability distribution." Wikipedia, The Free Encyclopedia, Mar. 10, 2016 Web. Mar. 30, 2016.
Wikipedia contributors. "Posterior probability." Wikipedia, The Free Encyclopedia. Wikipedia, The Free Encyclopedia, Mar. 9, 2016. Web. Mar. 30, 2016.

(56) References Cited

OTHER PUBLICATIONS

Wikipedia contributors. "Probability distribution." Wikipedia, The Free Encyclopedia. Wikipedia, The Free Encyclopedia, Mar. 28, 2016. Web. Mar. 30, 2016.

Wikipedia contributors. "Stepwise regression." Wikipedia, The Free Encyclopedia. Wikipedia, The Free Encylcopedia, Mar. 19, 2016. Web. Mar. 30, 2016.

Xiong, L., et al., k Nearest Neighbor Classification across Multiple Private Databases, Nov. 5-11, 2006, CIKM'06, 2 pages.

Sweeney, "How Real-Time Bidding (RTB) Changed Online Display Advertising", Clearcode Blog, Jan. 8, 2015 https://clearcode.cc/blog/real-time-bidding-online-display-advertising/[Feb. 3, 2021 11:48:43 AM].

* cited by examiner

FIG. 9

| id | ATL | INC | ATT | gConf | g5 | g50 | g95 | $R_T$ | $R_C$ | $R_{TW}$ | w | TU | TC | TWU | TWC | CU | CC |
|---|---|---|---|---|---|---|---|---|---|---|---|---|---|---|---|---|---|
| 1 | 63 | 39 | 25 | 99 | 12 | 62 | 167 | 63 | 49 | 65 | 56 | 263,501 | 1,670 | 149,058 | 955 | 16,065 | 79 |
| 2 | 18 | 15 | 14 | 100 | 7 | 18 | 30 | 57 | 52 | 93 | 42 | 2,195,456 | 12,009 | 918,316 | 8,573 | 145,216 | 748 |
| 3 | 17 | 14 | 8 | 91 | -3 | 10 | 44 | 46 | 43 | 53 | 47 | 784,135 | 3,380 | 346,656 | 1,840 | 69,511 | 296 |
| 4 | 534 | 84 | 6 | 100 | 74 | 335 | 3597 | 3 | 2 | 8 | 13 | 4,938,065 | 1,423 | 657,002 | 503 | 459,553 | 93 |
| 5 | 153 | 60 | 6 | 94 | -11 | 109 | 1317 | 4 | 3 | 9 | 15 | 2,409,520 | 902 | 364,234 | 343 | 110,991 | 32 |
| 6 | 5 | 5 | 46 | 100 | 3 | 5 | 8 | 629 | 610 | 887 | 40 | 1,955,475 | 122,968 | 787,613 | 69,874 | 205,131 | 12,520 |
| 7 | 12 | 11 | 1 | 65 | -23 | 9 | 72 | 2 | 2 | 6 | 24 | 2,833,414 | 511 | 681,506 | 380 | 198,932 | 33 |

METHODS, SYSTEMS, AND DEVICES FOR COUNTERFACTUAL-BASED INCREMENTALITY MEASUREMENT IN DIGITAL AD-BIDDING PLATFORM

CROSS REFERENCE TO RELATED APPLICATIONS

This application is a continuation of U.S. patent application Ser. No. 17/188,469 filed on Mar. 1, 2021, which is a continuation of U.S. patent application Ser. No. 16/425,309 filed on May 29, 2019, now U.S. Pat. No. 10,977,697, issued Apr. 13, 2021, which is a continuation of U.S. patent application Ser. No. 15/667,507, filed on Aug. 2, 2017, now U.S. Pat. No. 10,467,659, issued Nov. 5, 2019 which claims the benefit of U.S. Provisional Patent Application No. 62/370,614, filed on Aug. 3, 2016, and U.S. Provisional Patent Application No. 62/491,522, filed on Apr. 28, 2017. Each of the foregoing applications is hereby incorporated herein by reference in its entirety for all purposes.

BACKGROUND

Field

The embodiments disclosed herein generally relate to systems and methods for providing and/or improving a digital ad-buying platform system, and more particularly for counterfactual-based incrementality measurement in the digital ad-buying platform system.

SUMMARY

Various embodiments described herein disclose a digital ad-buying platform that can use counterfactual-based incrementality measurement by implementing randomization and/or a correction for auction win bias to avoid the need to identify counterfactual winner types in the control group. This approach can estimate impact at the individual consumer level. Confidence levels can be determined using Gibbs sampling in the context of causal analysis in the presence of non-compliance.

In some embodiments, a computer-implemented method for adjusting future bid requests based on a causal ad impact of previous bid requests comprises: receiving, by a computer system of a demand side platform, a first bid request from an ad exchange, wherein the first bid request is indicative of a first bidding opportunity at the ad exchange; matching, by the computer system of the demand side platform, ad campaigns of advertisers to the first bid request to identify a subset list of advertisers eligible to submit a bid to the first bidding opportunity; executing, by the computer system of the demand side platform, a pre-bid randomization scheme prior to submitting bids, whereby each of the subset list of advertisers are categorized in a control group or a test group; logging, by the computer system of the demand side platform, a phantom control impression, the phantom control impression comprising first user identifiers associated with consumers, wherein the ad exchange does not transmit advertisements from ad campaigns associated with the list of advertisers categorized as the control group to the first user identifiers; submitting, by the computer system of the demand side platform, the bids associated with ad campaigns from the subset list of advertisers categorized as the test group; receiving, by the computer system of the demand side platform, results of the bid submissions, wherein the results indicate whether the bid was won or lost; logging, by the computer system of the demand side platform, a test-win impression, the test-win impression comprising second user identifiers associated with consumers, wherein the ad exchange transmits advertisements from ad campaigns associated with the list of advertisers categorized as the test group that won the bid to the third user identifiers; logging, by the computer system of the demand side platform, a test-lost impression, the test-lost impression comprising third user identifiers associated with consumers, wherein the ad exchange does not transmit advertisements from ad campaigns associated with the list of advertisers categorized as the test group that lost the bid to the second user identifiers; accessing, by the computer system of the demand side platform, cookie data associated with the first user identifiers of the phantom control impression, the second user identifiers of the test-win impression, and the third user identifiers of the test-lost impression, wherein the cookie data comprises a cookie ID that can be utilized to identify browser actions of the associated consumers; determining, by the computer system of the demand side platform, the causal ad impact based on the browser actions associated with the phantom control impression, the test-win impression, and the test-lost impression; and allowing advertisers to utilize the causal ad impact in a second bidding opportunity, wherein the computer system comprises a computer processor and an electronic storage medium.

In certain embodiments, each of the subset list of advertisers are categorized as the control group or the test group based on a fraction probability, and wherein the causal ad impact is based on the fraction probability. In certain embodiments, the computer-implemented method further comprises: identifying, by the computer system of the demand side platform, a consumer response for the subset list of advertisers, wherein determining the causal ad impact is further based on the consumer response. In some embodiments, the consumer response comprises one or more of: a site visit, a registration, a subscription, an addition of items to a shopping cart, or a purchase.

In certain embodiments, each ad campaign is for an advertisement on at least one of: a search channel, a display channel, a mobile application channel, a video channel, a social media channel, or an email channel. In some embodiments, the method further comprises: determining, by the computer system of the demand side platform, a confidence factor for the causal ad impact, wherein the confidence factor comprises an interval and/or a value range associated with a probability percentile. In certain embodiments, the confidence factor is determined using Markov-Chain Monte-Carlo sampling. In some embodiments, the Markov-Chain Monte-Carlo sampling is a Gibbs sampling scheme.

In some embodiments, a system for adjusting future bid requests based on a causal ad impact of previous bid requests comprises: one or more computer readable storage devices configured to store a plurality of computer executable instructions; and one or more hardware computer processors in communication with the one or more computer readable storage devices and configured to execute the plurality of computer executable instructions in order to: receive a first bid request from an ad exchange, wherein the first bid request is indicative of a first bidding opportunity at the ad exchange; match ad campaigns of advertisers to the first bid request to identify a list of advertisers eligible to submit a bid to the first bidding opportunity; execute a randomization scheme prior to submitting bids, whereby each of the list of advertisers are categorized in a control group or a test group based on a fraction probability; log a phantom control impression, the phantom control impression comprising first user identifiers associated with consumers, wherein the ad exchange does not transmit advertisements from ad campaigns associated with the list of advertisers categorized as the control group to the first user identifiers; submit the bids associated with ad campaigns from the list of advertisers categorized as the test group; receive results of the bid submissions, wherein the results indicate whether the bid was won or lost; log a test-win impression, the test-win impression comprising second user identifiers associated with consumers, wherein the ad exchange does not transmit advertisements from ad campaigns associated with the list of advertisers categorized as the test group that lost the bid to the second user identifiers; access cookie data associated with the first user identifiers of the phantom control impression and the second user identifiers of the test-win impression, wherein the cookie data comprises a cookie ID that can be utilized to identify browser actions of the associated consumers; determine the causal ad impact based on the browser actions associated with the phantom control impression and the test-win impression; and allow advertisers to utilize the causal ad impact in a second bidding opportunity.

In certain embodiments, user identifiers associated with the control group are not sent an advertisement in response to the first bid request. In some embodiments, user identifiers associated with the control group are sent a general advertisement not associated with an ad campaign of an advertiser in the control group. In certain embodiments, to determine the causal ad impact the logs of the phantom control impression and the test-win impression are taken over a predetermined time period. In some embodiments, the randomization scheme is executed by categorizing each of the list of advertisers in the control group or the test group based on a fraction probability comprises using a hash function. In certain embodiments, matching ad campaigns of advertisers to the first bid request is based on at least one of: advertisers' targeting requirements, types of consumers advertisers want to reach, contexts in which advertisers want to reach them, governing campaign criteria, an available budget, a desired frequency of exposure, or publisher restrictions on which types of advertisers a publisher will accept.

In some embodiments, a computer-implemented method for adjusting future bid requests based on a causal ad impact of previous bid requests comprises: receiving, by a computer system of the demand side platform, a first bid request from an ad exchange, wherein the first bid request is indicative of a first bidding opportunity at the ad exchange; matching, by the computer system of the demand side platform, ad campaigns of advertisers to the first bid request to identify a list of advertisers eligible to submit a bid to the first bidding opportunity; submitting, by the computer system of the demand side platform, bids associated with ad campaigns from the list of advertisers; receiving, by the computer system of the demand side platform, results of the bid submissions, wherein the results indicate whether the bid was won or lost; executing, by the computer system of the demand side platform, a randomization scheme whereby each of the list of advertisers are categorized in a control group or a test group; logging, by the computer system of the demand side platform, a test group impression, the test group impression comprising first user identifiers associated with consumers, wherein the ad exchange transmits advertisements from ad campaigns associated with the list of advertisers categorized as the test group that lost the bid to the first user identifiers; logging, by the computer system of the demand side platform, a control group impression, the control group impression comprising second user identifiers associated with consumers, wherein the ad exchange does not transmit advertisements from ad campaigns associated with the list of advertisers categorized as the test group that won the bid to the second user identifiers; accessing, by the computer system of the demand side platform, cookie data associated with the first user identifiers of the test group impression and the second user identifiers of the control group impression, wherein the cookie data comprises a cookie ID that can be utilized to identify browser actions of the associated consumers; determining, by the computer system of the demand side platform, the causal ad impact based on the browser actions associated with the test impression and the control impression; and allowing advertisers to utilize the causal ad impact in a second bidding opportunity, wherein the computer system comprises a computer processor and an electronic storage medium.

In certain embodiments, integrated identifiers are used to determine causal ad impact, wherein each integrated identifier is associated with a particular consumer and the user identifiers associated with that particular consumer. In some embodiments, over a million user identifiers are assessed to create the integrated identifiers. In certain embodiments, the computer-implemented method further comprises: determining, by the computer system of the demand side platform, a confidence factor for the causal ad impact, wherein the confidence factor is based on a number of total user identifiers assessed to create the integrated identifiers. In some embodiments, the causal ad impact is used to redirect consumer browsing. In certain embodiments, the causal ad impact is used to prospect new customers.

For purposes of this summary, certain aspects, advantages, and novel features of the invention are described herein. It is to be understood that not necessarily all such advantages can be achieved in accordance with any particular embodiment of the invention. Thus, for example, those skilled in the art will recognize that the invention can be embodied or carried out in a manner that achieves one advantage or group of advantages as taught herein without necessarily achieving other advantages as can be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

A better understanding of the devices and methods described herein will be appreciated upon reference to the following description in conjunction with the accompanying drawings.

FIG. 9 is a table depicting embodiments of causal lift measurement results along with various related computations and intermediate values over seven campaigns;

DETAILED DESCRIPTION

Figure 1A:
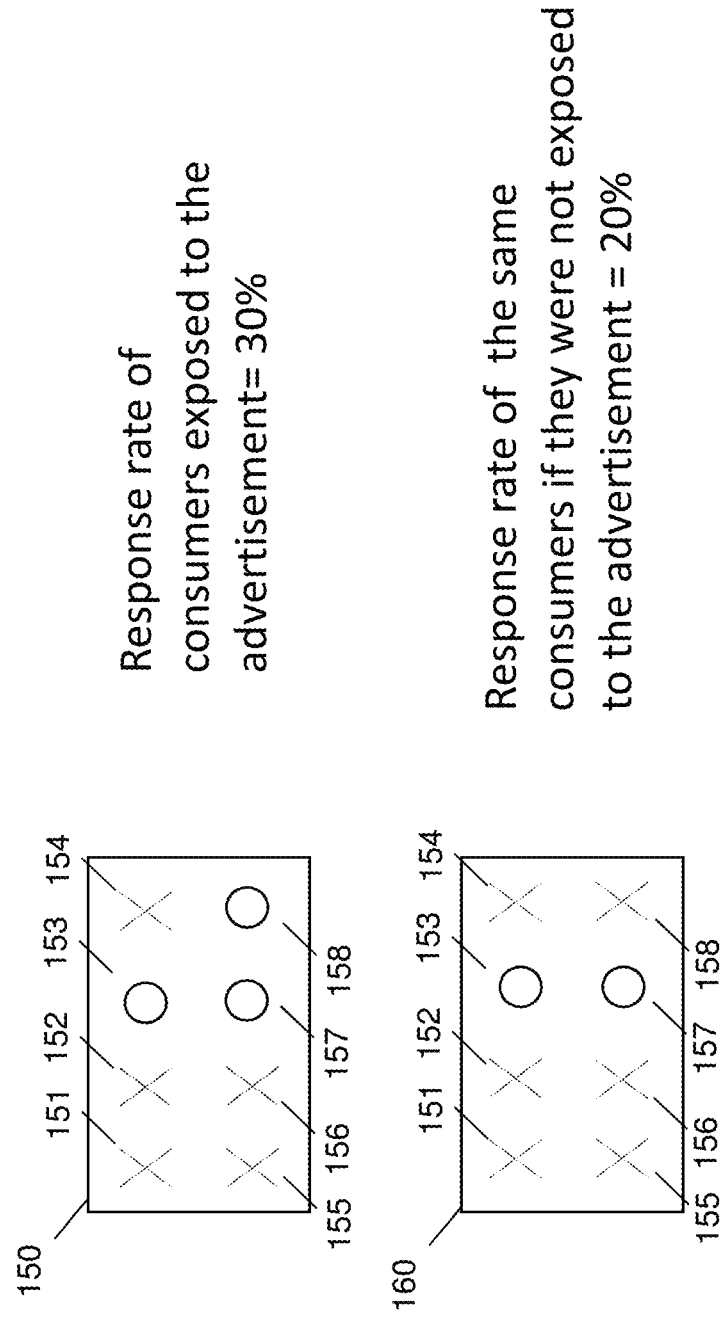
FIG. 1A is a block diagram depicting embodiments of systems and methods for determining causal ad effects.

Although several embodiments, examples, and illustrations are disclosed below, it will be understood by those of ordinary skill in the art that the inventions described herein extend beyond the specifically disclosed embodiments, examples, and illustrations and comprises other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Measuring effectiveness, and in particular, incremental effectiveness, of a digital advertising campaign can be of increasing importance to marketers. With the rise of the use of Demand-Side-Platforms (DSPs, or any digital ad-buying system), companies can execute advertisement campaigns in real time using Real-Time-Bidding (RTB) auctions. These advertisement campaigns can be run almost instantaneously for a user navigating his or her browser and can be performed automatically. As such, a measurement solution that satisfies both the advertiser concerns and the constraints of DSPs in real-time is of particular interest.

As global digital advertising budgets continue to grow and begin to overtake television as the dominant form of advertising, the measurement of the effectiveness for ad campaigns can be of increased importance, as advertisers may want to ensure that budgets spent on ad campaigns across search engines, displays, mobile, video, social media, email, and/or other digital channels are truly responsible for driving desired consumer behaviors. In particular, advertisers can be very interested in the behavior occurred as a result of exposure to advertising (in other words, the true causal impact). In some circumstances, the causal measurement of advertising can be far more important than simply measuring all behavior occurring after exposure to advertising, because the latter does not take into consideration users that would have made the purchase anyway, whereas the former identifies individuals that were persuaded to make the purchase as a result of the advertising.

In some embodiments of the present disclosure, individual events, such as the delivery of an ad to a consumer (for example, within a website, a mobile application, or other environment) and the subsequent online actions of that consumer (for example, product purchases) can be tracked and measured. Some embodiments use the framework of counterfactuals and potential outcomes for causal measurement of ad effectiveness. Some embodiments of the present disclosure provide a system for causal measurement of ad effectiveness that can be implemented by a DSP.

One constraint can arise from the fact that many digital ads are transacted through a real-time auction, where DSPs can compete for opportunities ("bid opportunities") to deliver ads to consumers in real time. A DSP may not have full visibility into the ad auction after submitting a bid to an ad exchange or Supply-Side Platform (SSP) on behalf of an advertiser. A DSP can have limited or no control over the auction mechanism and the outcome.

FIG. 1A is a block diagram depicting embodiments of systems and methods for determining causal effects. The causal measurement can be calculated by taking the difference between the response rate of consumers exposed to the advertisement, and the response rate of the same consumers if they were not exposed to the advertisement. For illustrative purposes, the response can be when the consumer purchases the advertised product.

This difference calculation measures how many consumers were persuaded to purchase the product in response to the advertisement, while taking into account the consumers that would have purchased the product anyway, whether or not they were exposed to the advertisement.

The former can be measured based on how many consumers purchased the product after they are exposed to the advertisement. Consumers 151-158 represent the exposed population 150. These consumers are shown the advertisement. Four consumers 153, 157, 158 purchase the advertised product thereafter. Thus, the response rate is 30%.

The latter is the response rate of the same consumers in 150, but represent the unexposed population 160. This unexposed population 160 represent the same consumers 151-158, but in a hypothetical scenario where they are not shown the advertisement. The consumers 153, 157 purchase the product. Thus, these two consumers 153, 157 would have purchased the product whether or not they are shown the advertisement.

Because the latter is a hypothetical scenario, the response is unobservable and cannot be measured. This hypothetical scenario is called a counterfactual. Nevertheless, the counterfactual response rate can be estimated by identifying a population of unexposed consumers that are statistically equivalent to consumers 151-158 by randomization. In other words, the bids are randomly assigned either to a test group that are actually shown the advertisement and a control group that are not shown the advertisement. Such randomization introduces ignorability to exposure of the advertisement, and thus, the responses of the consumers are not affected by whether the consumers are exposed to the advertisement.

Randomizing the ad opportunity to a test or control group can occur after the bidding process. However, randomizing the ad opportunity to a test and/or control group after winning the ad auction can result in wasteful ad spent if the bid opportunity were assigned to the control group instead of the test group because the advertiser already paid for the winning bid.

To alleviate this problem, randomization can occur before a bid auction by implementing a pre-bid randomization scheme. Randomly assigning the bids to either a test or control group before performing the bid auction creates two groups that can be statistically equivalent and do not have bias (for example, a bias characteristic of bids that won versus characteristics of bids that lost a bid auction). An example of a bias can comprise a population of bids that won, where the advertisers valued the consumer higher, and a population of bids that lost, where the advertisers valued the consumer lower. As such, the two populations may not be statistically equivalent as they valued the consumers differently. Thus, randomizing the bids before the bid auction negates the bias effect on the two populations.

To determine the incremental ad causal impact, bids in the test group can be submitted for bid auctioning, and the bids that win can be shown the advertisement. The response rate can be measured based on how many consumers purchase the product after being exposed to the advertisement. These consumers represent the exposed population of 150 in FIG. 1A.

Then, the bids in the control group are assessed to determine whether the bids would have won the auction. Those bids that would have won are observed to assess consume response rate. Thus, these consumers who were not shown the advertisement but would have won the auction can represent an estimate of the counterfactual scenario. In other words, this group represents consumers that would have been shown the advertisement but were not, and thus, the response rate represents the unexposed population of 160 in FIG. 1A.

Some embodiments of the present disclosure comprise estimating confidence intervals for the Ad Lift, such as a Gibbs-sampling procedure. Some methods and systems describe the application of certain techniques to estimate confidence intervals on the causal effect.

Some embodiments of the present disclosure comprise additional features to the pre-bid randomization scheme to alleviate some complications. Complications can arise in part from the fact that the buy-side systems performing the necessary measurements may not have full control of the mechanisms through which digital advertising transacts (for example, RTB auctions), and in part from the fact that digital advertising can be delivered to consumers using devices and browsers that are tracked by identifiers (for example, cookies, mobile advertising IDs, etc.) which can change over time. Another complication that can arise is the repeated occurrence of identifiers, which can lead to interference between observations. For example, the same identifier can occur in different bid opportunities over time, such that the responsiveness associated with the identifier in one bid opportunity can be affected by whether that identifier was exposed to an ad in a recent bid opportunity. Yet another complication can be that several identifiers are associated with the same human user, where some identifiers for one user can be in a test group and other identifiers for the same user can be in a control group, causing contamination of the identifiers. Cookie contamination can refer to the fact that the primary identifiers used to track browser-based usage on a single device can typically not persist over time, either because the browsers do not allow cookies to track them in the first place or because browsers or users periodically clear out the cookies. In such scenarios, the same consumer can appear to have multiple cookie identifiers, some that can be placed in a test group and others in a control group, leading to contamination of the populations. Cross device contamination can refer to the fact that even if all identifiers associated with a given device were stable, consumers may not encounter ads and make purchases on one device. The average US consumer typically owns multiple connected devices (such as a laptop, desktop computer, smart-phones, connected TVs, gaming consoles, and the like). Connected devices are likely going to be used more over time with improvements in technology, such as the Internet of Things, digital homes, and wearable devices. However, absent knowledge of which devices are owned by which consumers, some of the identifiers for a given consumer can correspond to a device placed in the Test group and some in the Control group leading to contamination.

Such complications can severely impair efforts to derive accurate measurements of Ad Lift. As such, some embodiments of the present disclosure describe a system to account for these complications and provide significant, positive, and stable lift.

Although certain embodiments of the present disclosure are described in connection with "display" advertising (for example, banners, videos, native ads, and other formats delivered on content websites, in mobile apps, on social platforms, and other digital media environments, across smart-phones, computers, and other connected devices), the systems and methods described can be applied to any other form of digital advertising, comprising display, search, email, etc.

Digital Ad-Buying Platform System

Figure 1B:
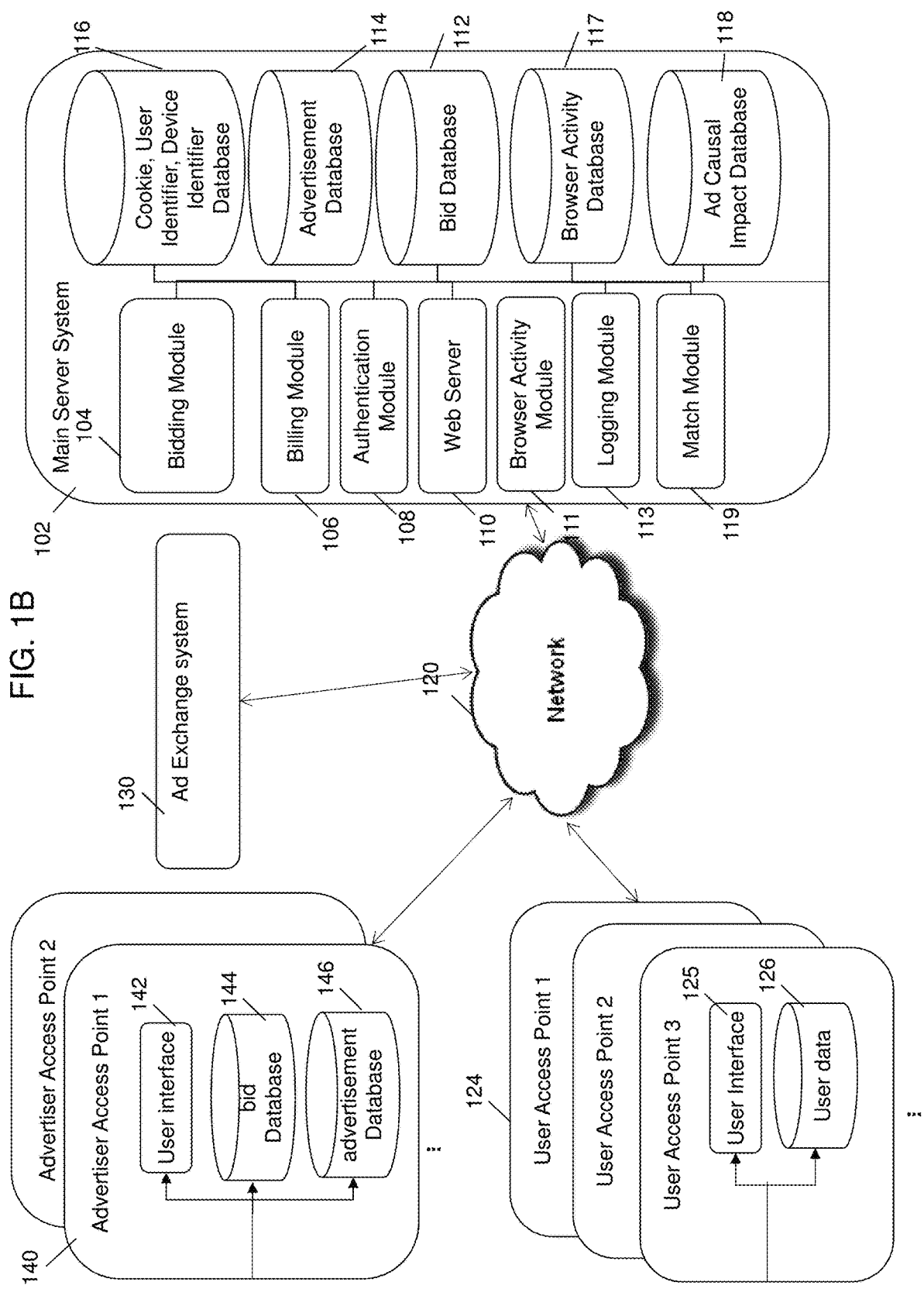
FIG. 1B is an embodiment of a schematic diagram illustrating an embodiment of a digital ad-bidding platform system.

FIG. 1B is an embodiment of a schematic diagram illustrating an embodiment of a digital ad-buying platform system. In some embodiments, a main server system 102 can be comprised of a bidding module 104, a billing module 106, an authentication module 108, a web server 110, an browser activity module 111, a logging module 113, a match module 119, a bid database 112, an advertisement database 114, a cookie and/or user identifier database 116, a browser activity database 117, and/or an ad causal impact database 118. The main server system 104 can be connected to a network 120. The network can be configured to connect the main server to an ad exchange system 130, one or more user access point systems 124, and/or one or more advertiser access points 140.

The bidding module 104 can function by submitting bids to the ad exchange system 130. In some embodiments, the bids can have a standard form, which can comprise the advertiser's name, address, preferences, bid price, size of advertisement, time stamp, previous history information, information retrieved from a consumer's online behavior on another website and/or other internet activity, and the like.

The billing module 106 can function by charging advertisers for various provided services using any available payment methods. The authentication module 108 can function by verifying the information associated with the advertisers (for example, information inputted by the advertiser; retrieved information based on a advertiser access point's IP address). The web server 110 can function to serve files that from web pages at the request of users. These web pages can provide an interface for users to interact with the system, these interactions comprising the generation, management, usage, deactivation, and troubleshooting of the user's account and/or selections (for example, selections of a bid opportunity, submission of an advertisement, selection of a bid price).

The results of the verification process can be used to verify the user. Using the main server system, an advertiser's previous configurations or customizations can be retrieved. This improves the process of bidding by allowing advertisers to cease work and pick up the work at a later time. Once an advertiser is verified, a user profile can be used to retrieve other customizations that can automatically be applied to a advertiser's future requests.

The verification process can be based on user input. For example, verification can be based on a code sent to a mobile device and/or a browser. In some embodiments, the user can be required to respond to the code (for example enter it into a system to activate an product customization and preview account).

In some embodiments, the individual can access a user interface and review the verification process. The individual can identify portions of the verification process and assess the results. In some embodiments, the system can request further identification verification information (for example identification documents) to verify a user. In some embodiments, the individual can challenge a result in the verification process (for example by submitting a request for the system to reassess an identification document that was interpreted incorrectly).

The bid database 112 can provide a collection of all bids submitted by the advertisers to the demand side platform. The bids can comprise a bid price, an identifier to an associated advertisement, an identifier to a targeted consumer and/or audience, and the like. The bids can be separated by characteristics, such as whether the bids were sent to a control or test group, whether the bids won or lost the bid, and the like.

In some embodiments, the bid database can comprise an indication of the targeted user's user access point 124 identifier, an IP address or browser cookie information.

The advertisement database 114 can comprise the advertisements submitted by the advertisers to display on a user's browsing interface. The advertisement database 114 can also comprise a collection of advertisements categorized by the advertisers that the advertisers can select for a particular bid. The advertisement database 114 can comprise a collection of electronic addresses to retrieve the advertisements. For example, the advertisement database 114 can comprise URLs or email addresses to retrieve the advertisements.

The cookie and/or user identifier database 116 can comprise information that can be used to identify a user, a user's browsing session, a user's device, characteristics about a user's browsing behavior, and the like. The cookie information can identify a particular browsing session and a user's selections and website history over a period of time. The cookie and/or user identifier database 116 can reference other cookie and/or user identifier information. For example, a cookie for a user can be linked with a user identifier for a user device, and also linked to an email address of a user.

The browser activity database 117 can provide a collection of user action on a browser instance. For example, cookie data can be used to determine the various websites the user visits. These websites can contain information on a user product, which can be used to determine the types of bids to submit for that consumer.

The ad causal impact database 102 can comprise determinations of ad causal impacts for a particular bid. For example, the average causal effect (ACE), the average treatment effect (ATT), the incrementality (INC), and/or the individual causal effect (ICE) can be stored in the ad causal impact database 102.

The advertiser access point 140 can comprise a user interface 142 for selecting a bid and/or selecting characteristics of the bid submission. The supplier access point 140 can comprise a bid database 144 that comprises information about previously submitted bids, current bids, and future bids. The bid database 144 can also comprise information on characteristics of the bids such as a bid's amount, advertisements associated with the bids, and the target consumers and/or audiences. The supplier access point 140 can comprise an advertisement database 146 that can provide information on the advertisement to be submitted with bid submissions. The advertisement database 146 can comprise the actual advertisements (for example, pictures and/or videos), or comprise an electronic address (for example, URLs or FTTP addresses) to the advertisement.

The user access point 124 can comprise a user interface 142 for displaying an advertisement and/or selection of a website or network resource. Such a selection of a website or network resource can initiate a bid opportunity at the ad exchange system 130, and thereafter, the main server system can initiate a bid auction with the advertisers. The user access point 124 can comprise user data 124 comprising information of a user and/or user device. For example, the user data 124 can comprise a user name, email address, social security number, and other personal information. The user data 124 can also comprise user device information associated with the user.

Computer System

Figure 1C:
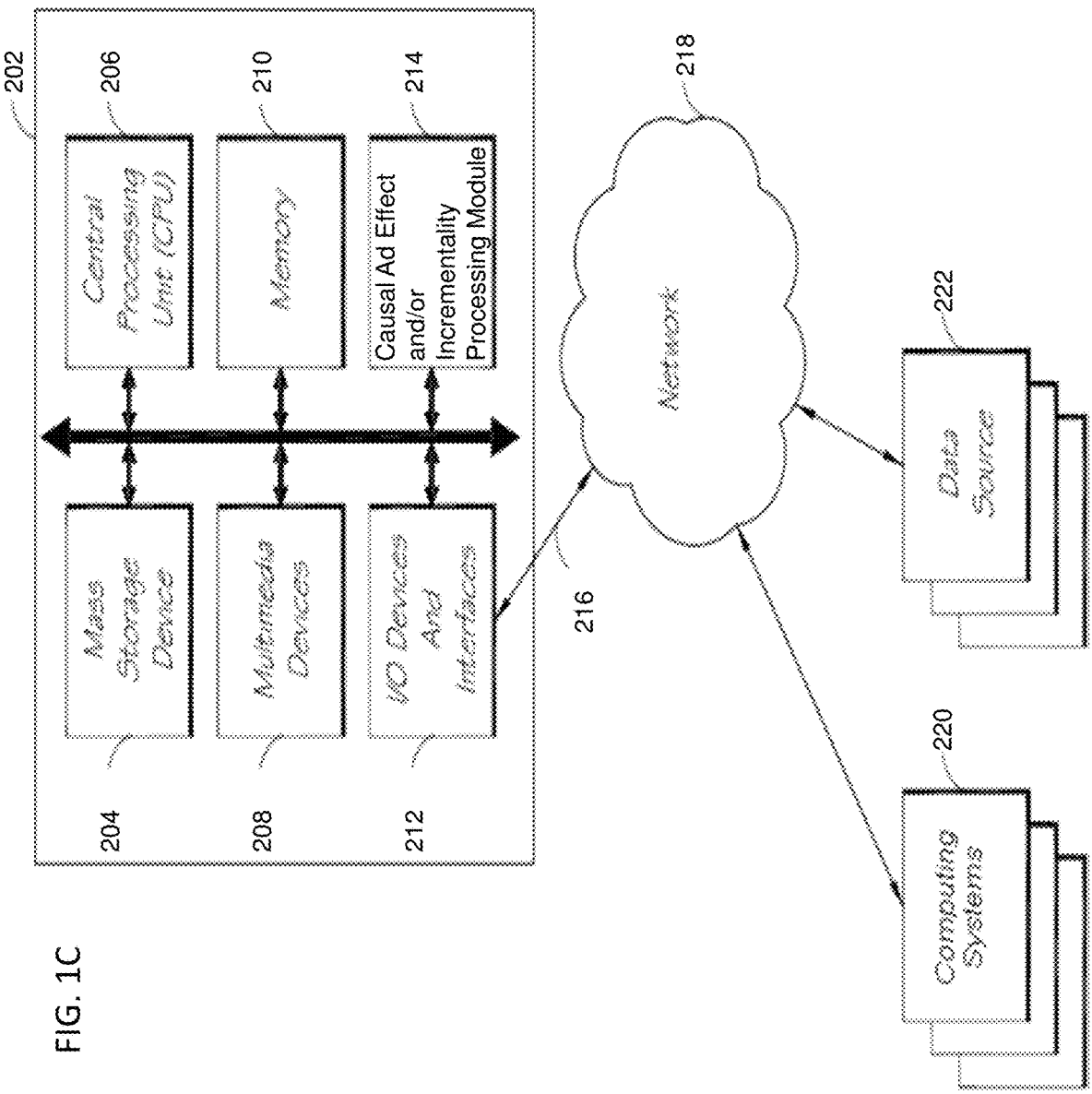
FIG. 1C is a block diagram depicting an embodiment of a computer hardware system configured to run software for implementing one or more embodiments of a digital ad-bidding platform system.

In some embodiments, the systems, processes, and methods described herein are implemented using a computing system, such as the one illustrated in FIG. 1C. The example computer system 202 is in communication with one or more computing systems 220 and/or one or more data sources 222 via one or more networks 218. While FIG. 1C illustrates an embodiment of a computing system 202, it is recognized that the functionality provided for in the components and modules of computer system 202 can be combined into fewer components and modules, or further separated into additional components and modules.

The computer system 202 can comprise a causal ad effect and/or Incrementality processing module 214 that carries out the functions, methods, acts, and/or processes described herein. The causal ad effect and/or Incrementality processing module 214 is executed on the computer system 202 by a central processing unit 206 discussed further below.

In general the word "module," as used herein, refers to logic embodied in hardware or firmware or to a collection of software instructions, having entry and exit points. Modules are written in a program language, such as JAVA, C, or C++, or the like. Software modules can be compiled or linked into an executable program, installed in a dynamic link library, or can be written in an interpreted language such as BASIC, PERL, LAU, PHP or Python and any such languages. Software modules can be called from other modules or from themselves, and/or can be invoked in response to detected events or interruptions. Modules implemented in hardware comprise connected logic units such as gates and flip-flops, and/or can comprise programmable units, such as programmable gate arrays or processors.

Generally, the modules described herein refer to logical modules that can be combined with other modules or divided into sub-modules despite their physical organization or storage. The modules are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

Computing System Components

The computer system 202 comprises one or more processing units (CPU) 206, which can comprise a microprocessor. The computer system 202 further comprises a physical memory 210, such as random access memory (RAM) for temporary storage of information, a read only memory (ROM) for permanent storage of information, and a mass storage device 204, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 202 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 202 comprises one or more input/output (I/O) devices and interfaces 212, such as a keyboard, mouse, touch pad, and printer. The I/O devices and interfaces 212 can comprise one or more display devices, such as a monitor, that allows the visual presentation of data to a user. More particularly, a display device provides for the presentation of GUIs as application software data, and multi-media presentations, for example. The I/O devices and interfaces 212 can also provide a communications interface to various external devices. The computer system 202 can comprise one or more multi-media devices 208, such as speakers, video cards, graphics accelerators, and microphones, for example.

Computing System Device/Operating System

The computer system 202 can run on a variety of computing devices, such as a server, a Windows server, a Structure Query Language server, a Unix Server, a personal computer, a laptop computer, and so forth. In other embodiments, the computer system 202 can run on a cluster computer system, a mainframe computer system and/or other computing system suitable for controlling and/or communicating with large databases, performing high volume transaction processing, and generating reports from large databases. The computing system 202 is generally controlled and coordinated by an operating system software, such as z/OS, Windows, Linux, UNIX, BSD, PHP, SunOS, Solaris, MacOS, ICloud services or other compatible operating systems, comprising proprietary operating systems. Operating systems control and schedule computer processes for execution, perform memory management, provide file system, networking, and I/O services, and provide a user interface, such as a graphical user interface (GUI), among other things.

Network

The computer system 202 illustrated in FIG. 1C is coupled to a network 218, such as a LAN, WAN, or the Internet via a communication link 216 (wired, wireless, or a combination thereof). Network 218 communicates with various computing devices and/or other electronic devices. Network 218 is communicating with one or more computing systems 220 and one or more data sources 222. The proxy services and/or proxy advisory services module 214 can access or can be accessed by computing systems 220 and/or data sources 222 through a web-enabled user access point. Connections can be a direct physical connection, a virtual connection, and other connection type. The web-enabled user access point can comprise a browser module that uses text, graphics, audio, video, and other media to present data and to allow interaction with data via the network 218.

The output module can be implemented as a combination of an all-points addressable display such as a cathode ray tube (CRT), a liquid crystal display (LCD), a plasma display, or other types and/or combinations of displays. The output module can be implemented to communicate with input devices 212 and they also comprise software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module can communicate with a set of input and output devices to receive signals from the user.

Other Systems

The computing system 202 can comprise one or more internal and/or external data sources (for example, data sources 222). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 202 can also access one or more databases 222. The databases 222 can be stored in a database or data repository. The computer system 202 can access the one or more databases 222 through a network 218 or can directly access the database or data repository through I/O devices and interfaces 212. The data repository storing the one or more databases 222 can reside within the computer system 202.

URLs and Cookies

In some embodiments, one or more features of the systems, methods, and devices described herein can utilize a URL and/or cookies, for example for storing and/or transmitting data or user information. A Uniform Resource Locator (URL) can comprise a web address and/or a reference to a web resource that is stored on a database and/or a server. The URL can specify the location of the resource on a computer and/or a computer network. The URL can comprise a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can comprise a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can comprise data sent from a website and/or stored on a user's computer. This data can be stored by a user's web browser while the user is browsing. The cookies can comprise useful information for websites to remember prior browsing information, such as a shopping cart on an online store, clicking of buttons, login information, and/or records of web pages or network resources visited in the past. Cookies can also comprise information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Demand Side Platform

Online publishers typically provide or allocate areas or portions of their web pages for advertising (or "ad") purposes. These areas or portions are generally differentiated from content created or published by the publishers. These areas or portions are hereafter sometimes generally referred to as impression opportunities. Some of these impression opportunities are available for advertising products, services, or businesses not directly provided by or related to the online publishers. In some embodiments, these impression opportunities are available to advertisers for a price.

Impression opportunities can comprise any form or type of space or region on a web page. This space or region can overlap with or reside within (or as part of) content on the page (for example, locations for banners, ad blocks, sponsored listings, margin ads and flash displays). Impression opportunities can be temporal, for example, associated with a time slot (for example, screening of a sponsored video footage prior to a requested screening, or available on a part of a day referred to as a day part). In some embodiments, an impression opportunity can sometimes not directly reside on a webpage. For example and in one embodiment, an impression opportunity can be generated from a webpage, such as due to a user action or some other trigger. For example, a pop-up can be generated when a webpage is loaded onto a browser. A window display or other widget can be generated responsive to a mouse-over. In some embodiments, an impression opportunity can comprise one or more elements such as a banner and an animated flash display extending from the banner boundary. In some embodiments, elements that can individually qualify as an impression opportunity can be collectively packaged as a single impression opportunity. In some embodiments, an impression opportunity is sometimes referred to as "inventory" (for example, of a publisher).

Impression opportunities are sometimes offered directly to advertisers. In some embodiments, publishers can offer impression opportunities through one or more ad networks and/or ad exchanges. An ad network or ad exchange can consolidate and/or manage impression opportunities on behalf of a publisher. An ad network or ad exchange can consolidate and/or manage impression opportunities across a plurality of publishers. In particular, an ad exchange can provide a platform for buying and selling advertising impressions. An ad exchange can provide services (for example, for trading impression opportunities) beyond that of ad networks. In some embodiments, ad networks and ad exchanges have distinct features as defined by the Interactive Advertising Bureau (IAB). Ad exchanges can comprise, but are not limited to Microsoft AdECN, Yahoo Right Media, and DoubleClick, a Google subsidiary.

In some embodiments, an ad exchange operates as a platform, interface or mediator for matching an impression opportunity buyer with a seller. As the online ad market becomes more automated and exchange-driven, ad exchanges can provide better efficiency and value to buyers and sellers than ad networks. As an ad exchange attempts to broker a transaction, the buy side (for example, advertiser or ad agency) can make a bid and the sell side (for example, publisher) can set a floor for accepting a bid or accept the highest bid from multiple sellers. Due to the benefits provided by ad exchanges, ad exchanges can command a relatively large share of the profit from transacting an impression opportunity. This can be especially true as ad rates or impression opportunity rates drop. In some cases, ad agencies can see their margins drop, for example, to 10% or lower. Taking more control of the buying process, such as by using the methods and systems disclosed herein, can change such a trend.

Moreover, in some embodiments, an ad exchange brokering a transaction between a seller and multiple buyers can provide more value to the seller than to the buyers. In other embodiments, an ad exchange can represent only a limited pool of impression opportunities to a buyer. Furthermore, an ad exchange can offer less competitive terms to a buyer for a given impression opportunity as compared to another ad exchange. The transaction interface provided by an ad exchange to a buyer can comprise unique and/or proprietary processes, specific configuration of impression opportunity-related information, non-uniform transaction terms and/or parameters. Due to the non-uniform transaction interface provided by each ad exchange, a seller may not be able to determine a preferred ad exchange(s) to work with. This can be true in general, for a particular ad campaign, or for a particular impression opportunity bid. In some embodiments, the systems and methods disclosed herein provide a single interface for a buyer (for example, an ad agency) to access a plurality of ad exchanges, and integrate multiple pools of impression opportunities from these ad exchanges for bidding by the buyer.

Embodiments of the methods and systems of a demand side platform disclosed herein can address the issues described above. The platform of the present disclosure provides the following one or more features and/or combination of the features that characterize the platform as a demand side platform:

(a) the platform integrates and interfaces to multiple exchanges to provide normalized access to a cross-exchange spectrum of disparate and different supply sources;
(b) the platform integrates and interfaces to third party ad servers for reporting on performance and/or operations;
(c) the platform calculates daily impression estimates for the multiple exchanges and campaigns;
(d) the platform provides an interface to match buyer demand to supplier supply by matching against the inventory of impressions;
(e) the platform provides a system to trade demand to supply to connect a plurality of buyers (demand) across a plurality of disparate sellers (supply)
(f) the platform provides reporting of performance of an ad campaign of a buyer across a cross-exchange spectrum of suppliers.
(g) the platform provides flighting: a period of time in which a defined bid price, daily spend goal and frequency cap are defined.

Embodiments of the demand side platform can comprise any combination of the above-mentioned features. With these embodiments of the demand side platform, the present disclosure provides performance, simplicity, processing algorithms and reporting not previously offered in a single integrated solution and service. Embodiments of the demand side platform can be offered, delivered or deployed as software, a service or a managed service, application or platform. Embodiments of the demand side platform can be offered, delivered or deployed as an outsourced service. In some embodiments, the demand side platform can be offered, delivered or deployed as a combination of managed and outsourced service.

Figure 2:
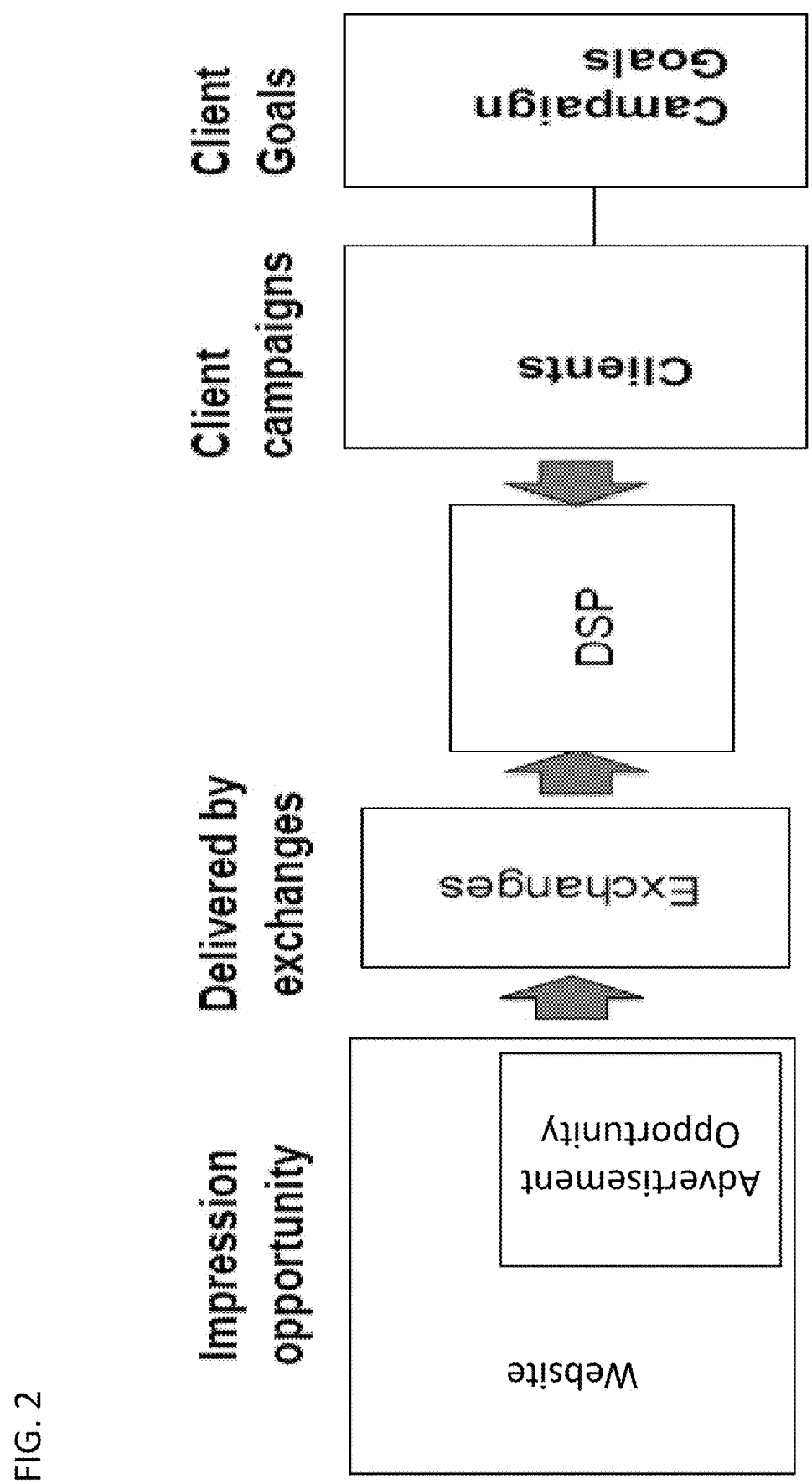
FIG. 2 is a block diagram depicting embodiments of systems and methods for providing a demand side platform.

Referring now to FIG. 2, embodiments of a system for a demand side platform which can integrate multiple pools of impression opportunities from multiple ad exchanges for bidding is shown. In brief summary, the system shows one or more impression opportunities available and/or delivered via one or more ad exchanges for bidding by one or more ad agencies. Each ad agency can represent one or more clients. The system further comprises a Demand Side Platform (DSP) for interfacing between the one or more ad agencies and the one or more ad exchanges. The DSP determining for the ad agencies and/or the clients which impression opportunity to bid and how to bid based on information provided from the buy side and sell side.

In further details of FIG. 2, each ad agency can represent one or more clients. Client entities interested in impression opportunities can comprise an individual, company, organization or a group of individual with shared interests. An ad agency can design and/or implement an ad campaign on behalf of a client. The ad agency can further procure or buy impression opportunities based on the advertising campaign on behalf of the client. In some embodiments, an ad agency and/or one or more clients the agency represents can collectively or individually be referred to as an advertiser. In some embodiments, an advertiser comprises an ad agency and a client the agency represents. A client can be an advertiser that directly uses the DSP to procure impression opportunities, for example, without using an ad agency. In some embodiments, an ad agency can use a DSP to concurrently and/or independently run ad campaigns for one or more clients. In some embodiments, an ad exchange can interface with an advertiser via a DSP. In other embodiments, an ad exchange can interface directly with an advertiser that uses a DSP to process information provided by the ad exchange.

A DSP can be implemented in hardware or a combination of hardware and software. The DSP can be built and/or configured for supporting or providing impression opportunity analyses and/or transactions. In some embodiments, a DSP is built and configured for providing buy side services for impression opportunities. A DSP can provide automation for impression opportunity workflow (for example, designing ad campaigns and applying these to multiple ad exchanges), supply integration (for example, interfacing with multiple ad exchanges and other supply partners to normalize pools of impression opportunity for analysis and bidding), and insight and analytics (for example, quantitative analysis in determining outgoing bids and reviewing performance).

The DSP can comprise any module, script, program, agent, state machine, component or set of executable instructions executing on one or more machines or servers. The DSP technology stack can incorporate open source and/or commercial code platforms, comprising but not limited to: Flex/Catalysts (for example, implemented in the DSP user interface and middleware in some embodiments), Perl (for example, implemented in the application layer and business logic in some embodiments), C/C++ (for example, implemented in the bidding module and/or brain engine in some embodiments), Netezza/PostGreSQL (for example, implemented in DSP data warehousing or data marts in some embodiments). These code platforms, as implemented in the DSP system, can support agile and interactive development of the system. In some embodiments, the DSP comprises a self-monitoring and/or self-healing framework. The DSP can comprise application programming interfaces (APIs) into some or all subsystems of the DSP.

The one or more machines or servers providing the DSP can comprise one or more server farms, for example incorporating features of servers described above in connection with FIGS. 1B-1C. The DSP hardware can interface with other network components via any type or form of communication protocol, comprising standard, proprietary and custom protocols. The DSP can have components operating at one or more layers of the network stack, such as the transport layer. The DSP can operate as an intermediary, logically and/or physically, between one or more ad exchanges and one or more advertisers (for example, ad agencies).

In certain embodiments, a DSP can be referred as a demand side service. In some embodiments, the DSP can comprise one or more services, subsystems, modules and/or applications hosted by a provider and/or an advertiser. For example and in one embodiment, the DSP can comprise a service or application engine hosted on one or more servers of the advertiser and/or a third party. The third party can be a server farm or hardware provider and/or service provider. The DSP can comprise a service, module and/or application dedicated for an advertiser, for example, to interface that advertiser with one or more ad exchanges. For example and in one embodiment, a DSP can comprise services, applications and/or hardware leased and/or owned by an advertiser. In some embodiments, an ad exchange can provide a DSP or some features of a DSP to an advertiser, for example, for ad campaign planning. Any of the systems and/or features associated with a DSP can be provided to advertisers and/or ad exchanges for a fee, for example, on a per use basis (for example, online access), for an access/lease period (for example, software license), and/or for purchase (for example, custom or configured hardware).

The DSP can provide an advertiser access to a plurality of impression opportunities provided via different providers (for example, publishers). The plurality of impression opportunities can comprise one or more pools of impression opportunities. For example and in one embodiment, a pool of impression opportunities can comprise impression opportunities from a publisher, a group of publishers, an ad exchange, and/or an ad network. In some embodiments, a pool of impression opportunities comprises impression opportunities across discrete and disparate supply sources. Certain ad networks and/or ad exchanges can control, distribute, offer, administer or otherwise manage one or more pools of impression opportunities. In some embodiments, certain impression opportunities or pools of impression opportunities can only be available via a specific ad network or ad exchange. The DSP can function as an interface between a plurality of impression opportunity providers (or sellers) and an advertiser (buyer). The DSP can offer a single interface, point of access, and/or relationship to a buyer, for example, to simplify transactions and/or analyses associated with a plurality of sellers. In some embodiments, the pools of impression opportunities can correspond to different types or categories of impression opportunities, for example, impression opportunities associated with a segment, channel, particular type of website or premium level, mouse-over vs. page-embedded impression opportunities, etc.

The DSP can process or analyze information associated with various impression opportunities and normalize these into metrics for comparison against goals set by advertisers. The DSP can normalize the information across impression opportunities, pools of impression opportunities, and/or ad exchanges. In some embodiments, the DSP can statistically and/or intelligently process or analyze the information to help an advertiser customize, determine or develop an advertising campaign based on the advertiser's goals. The DSP can dynamically update the metrics to help an advertiser adjust or implement advertising campaigns based on the goals. For example, the DSP can determine (for example, via an impression calculator and/or a bidding module of the DSP) an estimate of daily impression opportunities across the plurality of impression opportunity providers to identify an appropriate advertising campaign strategy. The methods and systems described herein can use the normalized metrics to bid for impression opportunities, for example, according to the advertising campaigns developed.

In some embodiments, a DSP can provide services to one or more advertisers in parallel, in sequence, on demand or otherwise. For example and in one embodiment, a single DSP can perform analysis and/or transactions for one or more advertisers concurrently and/or sequentially. An analysis can comprise any type or form of data processing, such as any statistical, algorithmic or other intelligent computation, profiling and/or prediction of impression opportunity information that can be useful in the formulation of ad strategy, campaign and/or bidding across one or more ad exchanges. A transaction can comprise any type or form of operation associated with bidding, trading, and/or procuring impression opportunities. Each analysis and/or transaction can be independent of another analysis and/or transaction of the same or different advertiser. For example, in some embodiments, an analysis can account for one or more transactions taking place at the same time. In certain embodiments, a transaction can affect or compete with another transaction. A transaction can be assigned a different priority and/or be configured relative to another transaction, for example, to potentially affect a certain result or a different result. In one embodiment, such as between transactions of a same advertiser, a transaction (for example, impression opportunity bid) can be processed to optimize or improve the chances or outcome of another transaction. In another embodiment, such as between transactions of different advertisers and/or ad campaigns, a transaction can be processed blindly, fairly and/or independently of another transaction.

In some embodiments, a plurality of DSPs can operate in parallel. In some embodiments, the plurality of DSP can support different advertisers. A transaction can affect or compete with another transaction from another advertiser or DSP. In certain embodiments, an advertiser can operate a plurality of DSPs in parallel, either using the same ad campaigns or using different ad campaigns. For example, in some embodiments, an advertiser can be evaluating one DSP against another, and/or comparing one ad campaign against another. A different DSP can help the same advertiser (for example, ad agency and/or client) develop a different ad campaign. A different DSP can provide the same advertiser access to different ad exchanges and/or information.

As a single interface across a plurality of ad exchanges, a DSP can receive and/or process any type or form of information supplied via the ad exchanges. For example, and as depicted in the embodiment shown in FIG. 2, each ad exchange and/or publisher can supply different types of information, similar information in a different format, data structure or granularity, using different communication protocols or standards, and at different time instances or intervals. In some embodiments, the information provided via some ad exchanges can conform at least in part to some standards. In certain embodiments, the information provided by an ad exchange can be specific to the ad exchange's custom or semi-custom interface. The availability and type of information provided via ad exchanges can vary, for example, from publisher to publisher. In some embodiments, an ad exchange can process and/or convey information from different publishers differently. Some ad exchanges and/or publishers can provide support for requesting or querying different types or granularity of data. Information provided via ad exchanges can comprise supply data with respect to impression opportunities and/or user data.

User data can comprise any type or form of data related to a user of a webpage, website, web session and/or web application. Such user information can comprise geolocation or geographical (sometimes generally referred to as "geo") information, system data, remarketing information, and/or third-party segment information. Geo information can comprise information comprising but not limited to information related to the user network, internet protocol (IP) address, access point (for example, Wi-Fi hotspot), geographical location and mobile tracking, and demographic and other geographical information system (GIS) data linked to the user location. System data can comprise any user information stored or tracked by the publisher or network, comprising but not limited to user preferences, browsing and transaction history, and user device information. Some of this information can be tracked by cookies and/or Adware.

Third-party segment information can comprise information identifying specific audience segments with certain online shopping habits. A number of companies, such as BlueKai, Exelate and Axciom, can provide such insights into the in-market shopping profiles of advertisers site audiences. Third-party segment information can comprise information related to a conversion (for example, pattern of user behavior and/or advertising characteristics leading to a newsletter sign-up, registration, transaction, etc) as well as behavioral targeting data sourced or bought from ad networks. Advertisers can use pre-existing segments or use the information provided to create custom audience segments, identify matching impression opportunities and reach prospects.

Remarketing information can comprise information comprising but not limited to information related to tracking a user after the user has left a publisher's site with a goal of driving the user back to a client's site to complete an action or transaction. Remarketing information can identify user or user attributes indicating past or potential success in remarketing efforts. In addition to the above, user data can comprise "IXI" data that provides measures of user wealth, income, spending, credit, investment style, share-of-wallet and share-of-market.

Supply data can comprise any type or form of data related to impression opportunities. Supply data can comprise information related to, but not limited to the network, publisher, channel, ad size and daypart. Network data can comprise information comprising but not limited to information related to the size, characteristics and audience reach of an ad network associated with an impression opportunity. Publisher data can comprise information comprising but not limited to information related to the content and web traffic of a publisher or website offering an impression opportunity. Publisher data can comprise an identifier of the publisher and/or website. Ad size can indicate the size of the impression opportunity using any type or form of measure, for example, digital image dimensions by pixels, such as 300× 250. Daypart information specifies portions of the days during which the impression opportunity is offered, for example, 12 pm-6 pm, 6 pm-9 pm, primetime, morning segment, late night, etc. Weekpart information can specify between weekend and weekday. Other time-specific parts can be provided or defined.

Channel data can comprise information comprising but not limited to information related to the type and reach of a media channel associated with an impression opportunity. A channel can be a category of media content targeting a specific audience. For example, channels can comprise categories such as news, finance, women, men, etc. In some embodiments, a channel can be a media type, for example, rich media, in-stream video, search, banner, text links, e-mail spam, opt-in e-mail advertising, other trackable media. Media type channels can also comprise podcasts, mobile device content and RSS feeds.

A DSP can receive a variety of sell-side information received via ad exchanges and/or normalize the information for a buyer or advertiser. The DSP can have custom interfaces for communicating with each ad exchange, for example, as depicted in the embodiment shown in FIG. 2. Each custom interface can comprise standard and/or custom modules for receiving portions of information from the corresponding ad exchange. Each custom interface can support the appropriate communication protocol conversion or translation. Each custom interface can comprise filters for removing redundant and/or unsupported data received from an ad exchange or other third party providers (for example, BlueKai). Each custom interface can comprise any type or form of extract, translate and load (ETL) capabilities to create a set of data or parameters in normalized, standard or generic (hereafter generally referred to as "normalized") form for the corresponding ad exchange. The normalized set of parameters can comprise one or more of geo, system, REM, third-party segment, publisher (ID), channel, ad size, weekpart and daypart data pertaining to an impression opportunity.

The userID, u, can refer to a consumer, and/or can comprise a cookie ID from a web browser, a mobile advertising ID from a mobile application. The bid request ID, r, can uniquely identify a bid request, and/or can refer to a group or family of bid requests. The exchange ID, e, refers to the bid request origin. The campaignID, c, can indicate a unique advertiserID, each advertiser which can run a collection campaign, each with its unique ID. The bid amount, b, can indicate some monetary currency. The auction outcome, x, can be won or lost. The clearing price, a, can be the amount the DSP pays to the exchange, which is typically lower than the bid amount, b.

A subset of advertisers can be eligible to bid due to factors, such as advertisers' targeting requirements, the types of consumers they want to reach, the contexts in which they want to reach them, governing campaign criteria such as the available budget and desired frequency of exposure, and/or publisher restrictions on which types of advertisers they will accept. The DSP can conduct matching and/or targeting to arrive at a subset list of advertiser campaigns eligible to submit a bid. The matching and/or targeting can be called the Bidder. The bidder can receive a plurality of inputs, such as (u, r, e), and can output several parameters, such as (u, r, e, c, b).

If the DSP determines there are more than one eligible advertiser campaigns, the DSP can determine an appropriate price to bid for the impression in question on behalf of the eligible campaigns.

In some embodiments, if the DSP wins the auction, the DSP will serve an ad from the campaign, c, to the consume represented by identifier u using the session information associated with the bid request, r, and/or log a record of the win.

The DSP can conduct logging of bidding events and/or consumer behaviors. Such consumer behaviors can be tracked using beacons or pixels on advertiser websites, mobile applications, and other digital interfaces and media.

One log can be a bid opportunity log for when the DSP receives a bid opportunity, which can comprise a userID u, a time-stamp t, a bid request ID r, and/or an exchange ID e.

Another log can be an impression log when the DSP serves an c at time t in response to a bid request for userID u.

A third log can be an event log for when a userID u performs a conversion action, such as purchasing an item on a mobile application or webpage relevant to a specific campaign c at time t. The user u may or may not have been exposed to the ad from campaign c.

In some embodiments, a consumer's response can be assessed within a certain time period. This time period can be called a window of influence $V_c$ of a campaign c. Advertisers can often be interested in measuring the causal effect of their ad up to a particular time after exposing consumers to the ad. This window of interest can be called a post-view window. Such a time frame can be an exact specified cutoff time.

Ad Impact and Causal Framework of Potential Outcomes and Counterfactuals

Advertisers typically engage in ad campaigns to generate awareness and interest in their products, and influence consumers to buy them. Advertisers may want to know how effective their ad campaigns are. Although some embodiments describe measuring the impact of a specific ad campaign, the measurement of effectiveness can be determined across multiple campaigns in certain cases, whether on a particular digital channel (for example, search or display) or across a plurality of digital channels.

Advertisers can measure the effectiveness by assessing a desired outcome that the advertiser wishes to elicit when exposing consumers to ads. For example, a desired outcome can comprise site visit, registration, subscription, addition of items to a shopping cart, purchase, etc. A desired outcome can be called a response or conversion. A response rate can denote the probability of a response either by the individual or by a campaign.

One concern can be that a response rate may not necessarily indicate the effectiveness of an advertisement. For example, a consumer with a response rate of 3% may not necessarily mean that consumers, on average, will perform the consumer response as a result of exposure to the advertisement. Some of the conversions could have occurred anyway in the absence of the exposure to the ad campaign. Following this example, a consumer may have visited the website, purchased the product, and notified their friends of the product with or without having seen the ad at all, and/or after seeing an ad from a different campaign from the one currently analyzed. Accordingly, it is possible that even without seeing the ad, the exposed consumers would have had a response rate of 2%. Thus, an estimated incremental effect of a campaign with a response rate of 3% can be in fact 1%. Out of the 3% total response rate, 1% of the response can be estimated to be caused by exposure of the ad.

For display ads, a consumer can click on an ad, leading the consumer to perform some downstream conversion behavior. In this case, the presence of a click can imply some causal relationship between the ad and the conversion. However, the link between the display ad and the ultimate conversion can be less direct. Consumers seeking these ads can instead perform a search related to the product in the ad, directly navigate to a website or mobile app, or simply be more comprised to make an online or offline purchase.

Identifying the incremental effect that caused the consumer to change his or her behavior can be a critical variable that advertisers desire to measure. Advertisers may want to direct ad spending towards campaigns shown to have larger incremental effects, or target consumers whose incremental response is likely to be higher. Accordingly, advertisers may want to compare a response rate of exposed consumers with a response rate of consumers they would have had if they had not been exposed to the ad to identify the incremental effect of their ad campaign. The response rate exposed consumers would have had if they had not been exposed to the ad campaign can be called a counterfactual response.

Some embodiments comprise determining a response rate of the exposed population and a response rate of the unexposed population, and taking a difference in the response rate. One assumption with this embodiment can be that the two populations, the exposed and unexposed populations, are statistically equivalent, or substantially equivalent. For example, the ad campaign targeting settings may apply to the entire exposed population, but may not apply to the entire unexposed population. These embodiments can be applied to individual treatment (for example, on the consumer level) where counterfactuals cannot be established.

Potential outcomes and counterfactuals can be used for causal analysis. For any individual consumer, i, $W_i$ can represent whether the consumer sees the advertisement ($W_i$=1), or whether the consumer did not see the advertisement, ($W_i$=0). When the consumer sees the advertisement ($W_i$=1), the consumer can be considered treated and/or exposed. When the consumer does not see the advertisement ($W_i$=0), the consumer can be considered not treated and/or not exposed.

The response of the individual consumer can be represented by $Y_i$. In some embodiments, if the consumer responds to the exposure to the advertisement (for example, performs the desired behavior such as a conversion or addition to a shopping cart), ($Y_i(W_i)$=1), and if the consumer does not respond to the exposure to the advertisement, ($Y_i(W_i)$=0).

The response of a consumer exposed to an advertisement can be considered as $Y_i(1)$, and a response of a consumer not exposed to the advertisement can be considered as $Y_i(0)$. These two response values can be considered as potential outcomes.

The outcome of $Y_i(W_i)$ can be observable as it represents a measurement of behavior in response to exposure or non-exposure to advertisement. The outcome of $Y_i(1-W_i)$, however, can be difficult to measure, as it represents a counterfactual outcome.

The Individual Causal Effect (ICE) for a consumer i can be determined by:

$$ICE_i = Y_i(1) - Y_i(0).$$

Some embodiments disclose estimating an average causal effect over a group of consumers. One way to perform this average can be to establish a uniform distribution over the userIDs, i. In other words, all userIDs, i, can have equal probability.

Figure 3:
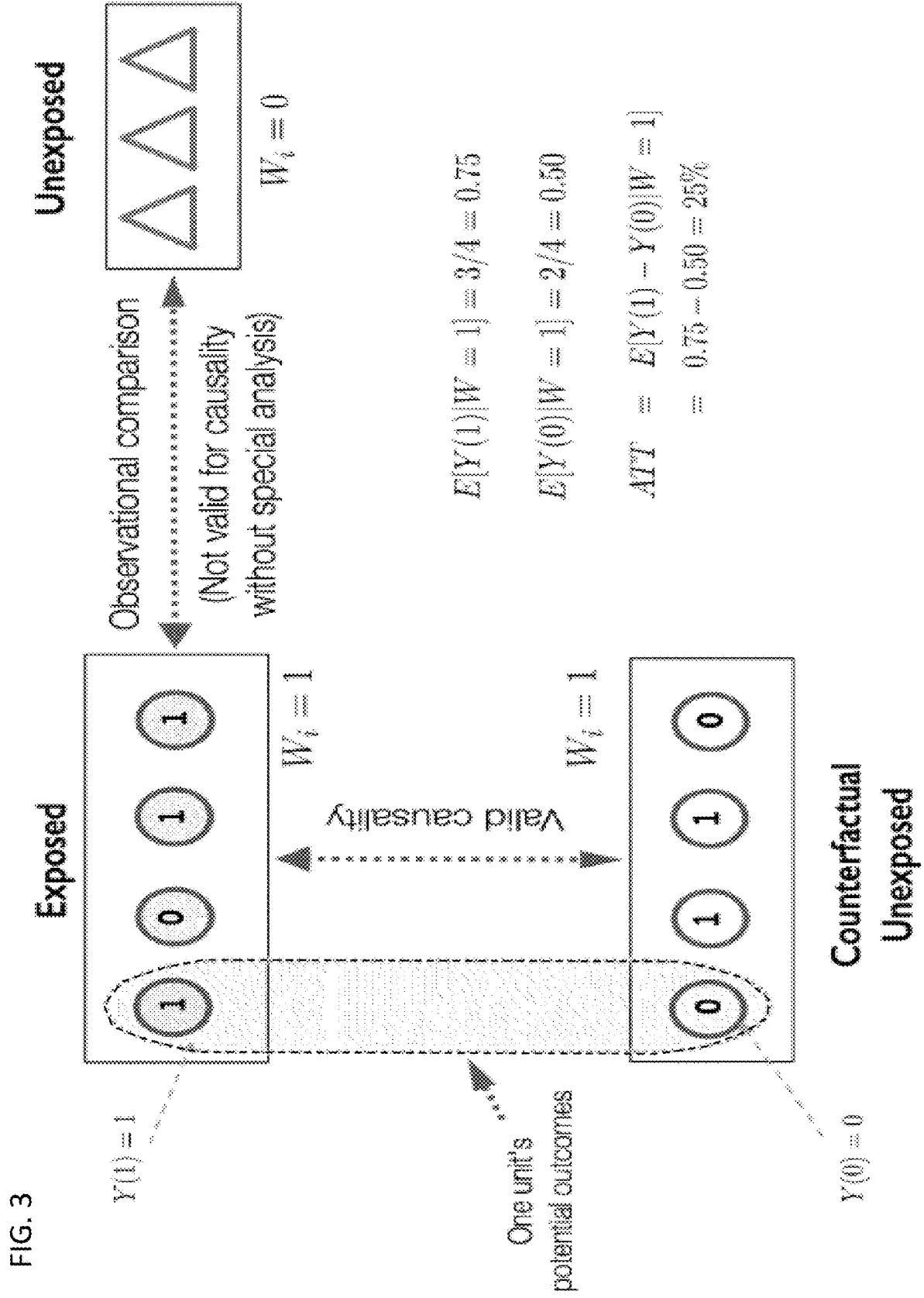
FIG. 3 is a block diagram depicting embodiments of causal ad impact in terms of counterfactual and potential outcomes.

FIG. 3 is a block diagram depicting embodiments of causal ad impact in terms of counterfactual and potential outcomes. Each circle and triangle can represent a consumer and/or a userID, i. The circles can represent userIDs, i, in the population that are exposed to the ad during the normal course of running an ad campaign, $W_i$=1. Triangles can denote that the userIDs, i, that have not been exposed to the ad, $W_i$=0. The different shapes can indicate that the populations are not statistically equivalent. The numbers inside the shape (for example, 0 or 1) can indicate the response of the userID. The rectangle named "Exposed" comprises the if-exposed potential outcomes of the exposed population, the $Y_i(1)$ values, which can be observable. The rectangle named "Counterfactual Unexposed", comprises potential outcomes of the exposed population had they not been exposed to the ad campaign, the $Y_i(0)$ values, which can be unobservable counterfactuals. The difference in response rates of the exposed population (E[Y(1)|W=1]) and that of the Counterfactual Unexposed population (E[Y(0)|W=1]) can be considered the Average Treatment Effect of the Treated (ATT), the causal effect. Accordingly, for the example in FIG. 3, the response rate of the exposed population (with 3 out of 4 responses) is:

$$E[Y(1)|W=1]=75\%$$

As such, in some embodiments, the response rate of the counterfactual unexposed population (potential outcomes of the exposed population had they not been exposed to the ad campaign, with 2 out of 4 responses) is:

$$E[Y(0)|W=1]=50\%$$

In some embodiments, the Average Treatment Effect (ATT) of the treated, which is the difference in response rates of the exposed population and the counterfactual unexposed population, is:

$$ATT=(E[Y(1)-Y(0)|W=1]=75\%-50\%=25\%$$

Accordingly, in the example of FIG. 3, the causal effect of the ad campaign is 25%. Accordingly, this takes into account the userIDs that could have performed the response irrespective of exposure to the ad, userIDs that did not perform the response but would have if exposed to the ad, and userIDs that performed the response but would not have if exposed to the ad.

The Average Causal Effect can be denoted as follows:

$$ACE = E_i[ICE_i] = E_i[Y_i(1) - Y_i(0)]$$

The ACE can refer to the population-level average response rate if all consumers had been exposed to the ad minus the response rate if none were exposed. The expectation, $E_i$, can refer to the distribution of consumers, i. This can represent the incrementality across all consumers, exposed and unexposed.

To determine the incrementality of the exposed consumers only, the ACE, can be conditioned on W=1:

$$ATT = E_i[ICE_i|W_i=1]$$

$$ATT = E_i[Y_i(1) - Y_i(0)|W_i=1]$$

$$ATT = E[Y(1) - Y(0)|W=1]$$

$$ATT = E[Y(1)|W=1] - E[Y(0)|W=1]$$

The first term, E[Y(1)|W=1] can refer to the observable average response rate of exposed consumers, while the second term, E[Y(0)|W=1] can be a counterfactual, which may not be directly observable because it is the unexposed potential response rate of exposed consumers.

Some embodiments use the observed response rate of unexposed consumers, E[Y(0)|W=0], in place of the counterfactual second term:

$$S = E[Y(1)|W=1] - E[Y(0)|W=0]$$

This can be the difference between the average response rates of treated and untreated consumers, both of which can be observable. This can measure association, but may not always measure causation correctly.

Figure 4:
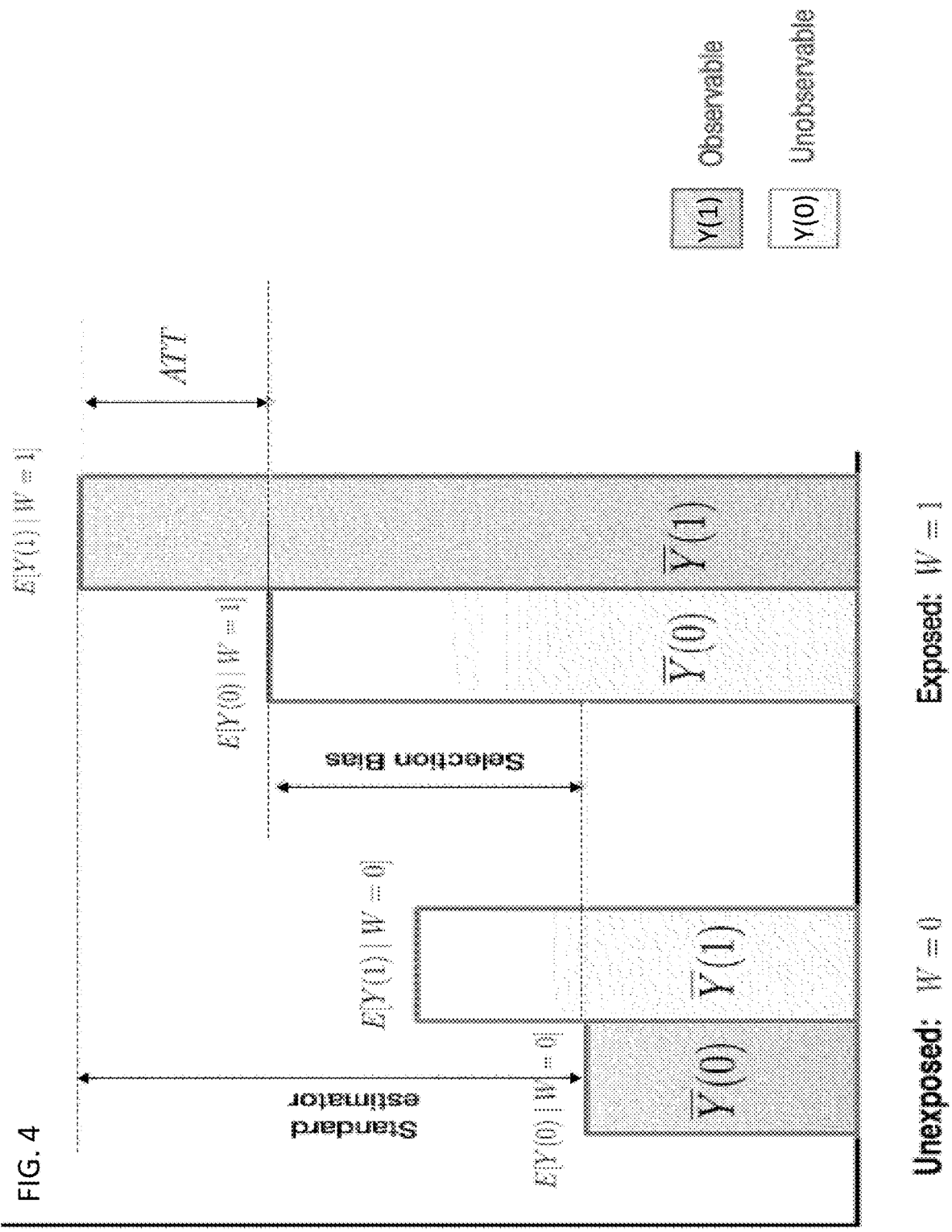
FIG. 4 is a graph depicting embodiments of a selection bias and Average Treatment Effect.

FIG. 4 is a block diagram depicting embodiments of a graph for selection bias and Average Treatment Effect. The height of the bars can represent the expected value of a potential outcome Y(0) or Y(1) for a population. The left pair of bars can represent the unexposed population, W=0, and the right pair of bars can represent the exposed population, W=1. The Standard Estimator can be one measure to measure causal effect, which is the difference between the two observable average outcomes, S.

Post-Bid Randomization

One concern for the Standard estimator described in the section above is that the Standard Estimator comprises a Selection Bias, E[Y(1)|W=1]−E[Y(0)|W=1], with the ATT, E[Y(0)|W=1]−E[Y(0)|W=0], in its estimate:

$$S=E[Y(1)|W=1]-E[Y(0)|W=0]$$

$$S=E[Y(1)|W=1]-E[Y(0)|W=1]-E[Y(0)|W=1]-E[Y(0)|W=0]$$

$$S=ATT+\text{Selection Bias}$$

One way to alleviate this concern is to introduce randomization, where the treatment variable, $W_i$, is assigned 0 or 1 randomly. Then, the potential outcomes $Y_i(0)$ and $Y_i(1)$ can be independent of $W_i$.

When the potential outcomes $Y_i(0)$ and $Y_i(1)$ are independent of the exposure, $W_i$, we can say that the exposure is ignorable with respect to potential outcomes, not actual outcomes. In other words, in some embodiments, ignorability of exposure is the distribution of potential outcomes independent of exposure, the overall distribution of potential outcomes, $Y_i(0)$ and $Y_i(1)$, across the population is identical to their distribution in the exposed sub-population, W=1, and in the unexposed sub-population, W=0.

In certain embodiments, when ignorability is true, the expectations of the potential outcomes are not affected by conditioning on exposure:

$$E[Y(1)|W=1]=E[Y(1)|W=0]=E[Y(1)]$$

$$E[Y(0)|W=1]=E[Y(0)|W=0]=E[Y(0)]$$

If ignorability, sometimes referred to as exchangability, applies, ATT can be estimated from observable averages:

$$ATT=E[Y(1)|W=1]-E[Y(0)|W=1]$$

$$ATT=E[Y(1)]-E[Y(0)]$$

Figure 5:
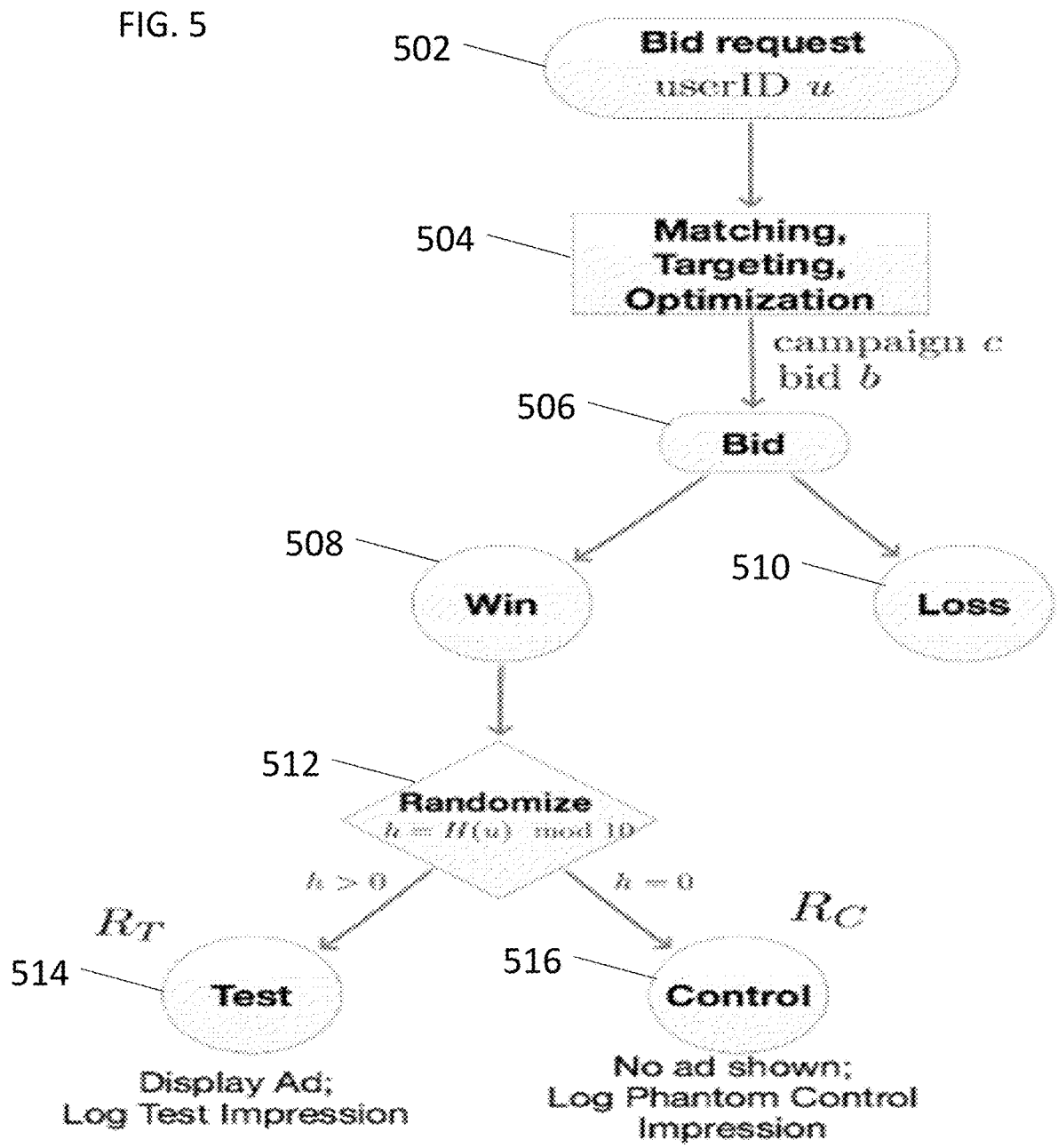
FIG. 5 is a block diagram depicting embodiments of a post-bid randomization scheme.

In some embodiments, a post-bid randomization is used. FIG. 5 is a block diagram depicting embodiments of a post-bid randomization scheme. At block 502, the ad exchange can send bid opportunities, or also called bid requests, along with associated data about the request to various DSPs, the DSPs associated with clients who are advertisers that compete to win the opportunity.

At block 504, the DSPs can receive these bid requests from the exchanges. Typically, the DSPs can receive bids from hundreds or thousands of clients (or advertisers) to submit bids throughout the day. In response to the bid request, the DSP can select a subset of advertisers that can be eligible to bid. The DSP can select the qualified advertisers based on various factors, such as advertisers' targeting requirements, the types of consumers they want to reach, the contexts in which they want to reach them, governing campaign criteria such as the available budget and desired frequency of exposure, and/or publisher restrictions on which types of advertisers they will accept. The DSP can conduct matching and/or targeting to arrive at a subset list of advertiser campaigns eligible to submit a bid. The matching and/or targeting can be called the Bidder.

At block 506, the DSP can submit the bids to the ad exchange. Depending on the bids that the ad exchange receives, the bid can either win at block 508 or lose at block 510.

At block 512, a probability of bids that have won the auction can be divided by a random fraction p, where the p<1, and/or a probability. The probability can be used to divide the bids into two groups.

In some embodiments, at block 514, the bids that are selected based on the random fraction p are shown the advertisement related to respective campaigns c, and can be considered the Test group. In certain embodiments, at block 516, the other remaining bids, (1−p), are not shown the advertisement but a general advertisement, also called a Public Service Announcement (PSA), and this group of bids can be considered the Control group. In some embodiments, the other remaining bids, (1−p), can be shown no advertisements.

The Test/Control assignment can be accomplished by performing a deterministic uniform hash function $h_K(u)$ that maps a userID u to a k-digit decimal number. The Test/Control assignment can then be based on the last few digits of the decimal number. The hash function can be uniform such that if a random userID u is selected, then the uniform hash function $h_K(u)$ is uniformly distributed over the range of 0 to $10^k-1$. For example, the holdout fraction can be p=10%. Then, any userID u that has a deterministic uniform hash function $h_K(u)$ ending in 0 can be assigned to the Control group, and otherwise be assigned to the Test group. The hash functions can be uniformly distributed, and the last digit of the deterministic uniform hash function $h_K(u)$ can be equally likely to be any of the 10 decimal digits, roughly about 10% of the userIDs can be mapped to the Control group. Since the Test/Control group assignments can depend on the userID via the hash function, the Test/Control group assignment can be ignorable when estimating causal effects.

In some embodiments, the post-bid randomization scheme can be implemented using the following pseudo-code:

```
Procedure 1 Post-Bid Randomization to estimate causal effect
Input:c₀: CampaigniD being measured,p: Holdout (control) Fraction,
H(u,p) =test/control assignment function
 1:    while True do                    ▷ endless loop of bidder
 2:       (u, r, e) ← Bid Request from exchange e;
 3:       (u, r, e, c, b) ← Bidder match/targeting/bid-Optimization;
 4:       submit bid (u, r, e, c, b)        to exchange e;
 5:       (u, r, e, c, a, x) ← AuctionResult from exchange e;
 6:       t ← current time;
 7:       g ← H(u, p);                  ▷ g ∈ (T, C)
 8:       if x == Lose then
 9:          do nothing
10:       else if c == c₀ and g == C then
11:          serve PSA ad to bid request r;
12:          log a "phantom control impression" Imp(t, u, c₀, C)
13:       else
14:          serve campaign c ad to bid request r;
15:          if group == T then
16:             log a test impression Imp(t, u, co, T)
17:          end if
18:       end if
19:    end while
```

The specific campaign for which the estimate of causal effect ATT is estimated can be denoted $C_0$. C can represent the Control group and T can represent the Test group. If the userID u is chosen at random, then $P_u[H(u,p)=C]=p$. Such a function can be implemented by a uniform hash function $h_k(.)$.

In some embodiments, a phantom control impression Imp(t, u, $c_0$, C) can be logged, which is a log of the fact that at instant t, the userID u was about to see an ad from the campaign $c_0$, but before the ad was shown, the userID was shown a PSA ad instead, because H(u,p)=C. Since the Test/Control group assignment can depend only on the userID u, the potential outcomes of u does not have to depend on u, and thus, the Test/Control group assignment is ignorable for the conditional expectations E[Y(1)|W=1] and E[Y(0)|W=1].

In some embodiments, the causal effect (ATT) is estimated. The response rates of the Test group (W=1) and the Control group (W=0) can be estimated. The Test group can be estimated by:

$$R_T = E[Y(1)|W=1]$$

The Control group can be estimated by:

$$R_T = E[Y(0)|W=0]$$

Using the post-bid randomization scheme, Test userIDs can be exposed to an ad from the campaign c, and Control userIDs can be exposed to a PSA ad at a particular time. From the event logs, the response rate (Y=1) can be determined, where an event $E_y(u,c,t')$ is a response to a Test impression IMP(u, c, t, T) if $t'-t \leq V_c$, where $V_c$ is the PV window of the campaign c, and similarly to the Control group.

The number of Test and Control impressions can be $n_t$, $n_c$ respectively. The number of Test and Control responses can be $k_t$, $k_c$ respectively. The response rates can be determined by:

$$R_T = E[Y(1)|W=1] = k_t/n_t$$

$$R_C = E[Y(0)|W=0] = k_c/n_c$$

The causal effect can then be estimated by:

$$ATT = R_T - R_C$$

$$ATT = k_t/n_t - k_c/n_c$$

Post-Bid Randomization

In some embodiments, because Test/Control group assignment is performed after placing a bid in Post-bid randomization, the advertiser can pay for an ad impression that the advertiser won regardless of whether the consumer is served the actual campaign ad associated with the advertiser of a PSA. Thus, if the holdout fraction is 10%, the advertiser can waste 10% of their ad budget on PSA ads. This can result in hurt a campaign's rate of return by a corresponding percentage. Thus, because of the limitation in DSP technology, a post-bid randomization results in advertisements that were not shown.

Furthermore, a larger holdout fraction can be required to improve measurement significance, further limiting advertisements that would have been automatically selected to be displayed using DSP technology.

To address this DSP technology program, some embodiments of the present disclosure comprise a pre-bid randomization scheme and a method of estimating ATT under the pre-bid randomization scheme, which overcomes the technical problem of today's DSP such that the consumer can view the advertisement.

In a post-bid randomization scheme, logging a test or control impression can occur after winning the auction. Thus, userIDs that are logged as Test can see the advertisement. In contrast, in a pre-bid randomization scheme, a fraction p of userIDs can be logged as phantom control impressions C before submitting a bid to the exchange, and a bid is submitted if the userID is among the 1−p userIDs in the Test group. For the bids in the Test group that win the auction, the Test-Win (TW) impression can be logged, whereas the bids in the Test group that lose the auction, the Test-Loss (TL) impression can be logged.

Phantom control impression Imp (t, u, $c_0$, TW) can indicate that at time t, a bid could have been submitted for userID u on behalf of campaign $c_0$, but was not submitted because u is a Control userID (H(u,p)=C). The Test-win impression IMP(t,u, $c_0$, TW) can indicate that at time t the DSP won a bid submitted to the exchange on behalf of the campaign $c_0$ and the Test userID u is exposed to the campaign $c_0$ ad. The phantom Test-Loss impression Imp(t,u, $c_0$, TL) can indicate that at time t the DSP lost a bid submitted to the exchange on behalf of campaign $c_0$, and the Test userID u is not exposed to the campaign $c_0$ ad.

In some embodiments, the pre-bid randomization scheme can be implemented using the following pseudo-code:

```
Procedure 2 Pre-Bid Randomization to Estimate Causal Effect
Input: c₀: CampaigniD being measured, p: Holdout (control) Fraction,
    H(u, p)=Test/control assignment function
 1:  while True do    ▷ endless loop of bidder
 2:    (u, r, e) ← Bid Request from exchange e;
 3:    (u, r, e, c, b) ← (Bidder match/targeting/bid-optimization);
 4:    t ← current time;
 5:    g ← H(u, p) ;  ▷ g ∈ (T, C)
 6:    if c == c₀ and g == C then
 7:      do not submit bid;
 8:      log a "phantom control impression" IMP (t, u, c₀, C)
 9:    else       ▷ non-tested campaign, or Test userID for c₀
10:      submit bid (u,r, e,c,b)              to exchange e;
11:      (u, r, e, c, a, x) ← Auction Result from exchange e;
12:      t ← current time;
13:      if x Win then
14:        serve campaign c ad to bid request
                r;
15:        if c == c₀ then
16:          log a Test WIN impression
IMP(t, u, c₀, TW);
17:        end if
18:      else if c == c₀ then
19:        log a "phantom" Test LOSS impression
IMP(t, u, c₀, TL)
20:      end if
21:    end if
22:  end while
```

In some embodiments, ATT can be measured using the pre-bid randomization scheme from impression and event logs over a certain period of time. Impression logs can comprise C, TW, and TL userIDs. T can comprise the union between TW and TL. As noted above, ATT can be determined by:

$$ATT = E[Y(1)|W=1] - E[Y(0)|W=1]$$

ATT can be determined by the average observed response rate of exposed consumers minus the average counterfactual non-exposure potential response rate of exposed consumers.

The exposed population can be TW and the average response rate $R_{TW}$ can be an estimate for the first term in the ATT (E[Y(1)|W=1]).

In some embodiments, a difficulty to determine the second term in ATT (E[Y(0)|W=1]) can be that the populations of the exposed userIDs (TW) and unexposed userIDs (C and TL) may not be statistically equivalent. The set TW can refer to the subset of T consisting of userIDs in bids won in the auction, which could be selecting for consumers who have a higher or lower response rate than that of the overall Test population. Thus, there could be a win bias in the auction. Consumers that a DSP bids on and wins can be expected to be statistically different from those it bids on and loses. This can at least be in part due to the fact that bids lost can be lost because some other buyer bid higher in the auction, presumably on the basis of some information unknown to the DSP in question. This can suggest that the consumers bid on and lost might be systematically more attractive in some sense (for example, with higher response rates). Thus, if not accounted for, win bias can produce a negative lift measurement, if the more responsive userIDs within the Test population are suppressed.

As noted above, $W_i=1$ and $W_i=0$ can indicate whether the userID is exposed or not exposed to the ad campaign. $Z_i$ can indicate whether the userID $u_i$ is assigned to the Test ($Z_i=1$) or Control ($Z_i=0$) group. Accordingly, there can be three possibilities:

$Z_i=0; W_i=0 \Rightarrow \text{userID} u_i$ is assigned to Control and not exposed($C$)

$Z_i=1; W_i=0 \Rightarrow \text{userID} u_i$ is assigned to Test and not exposed($TL$)

$Z_i=1; W_i=1 \Rightarrow \text{userID} u_i$ is assigned to Test and exposed($TW$)

When $Z_i \neq W_i$, the condition can be considered non-compliance.

Two user types $U_i$ can be assigned based on the test-assignment variable $W_i(Z_i)$. The first types of bids can be those bids who would win if they were assigned to Test $U_i=1$ and those bids who would lose if they were assigned to Test $U_i=0$:

$U_i=1$ represents winner type: $W_i(0)=0$ and $W_i(1)=1$ $U_i=0$ represents loser type: $W_i(0)=0$ and $W_i(1)=0$ The potential outcome random variable $Y_i(Z_i)$ can be a response of (0 or 1) of a userID $u_i$ whose Test/Control group assignment is $Z_i$ for pre-bid randomization scheme. The overall observable average response rate of userIDs assigned to Test can be $R_T=E[Y(1)]$, regardless of their exposure status.

Figure 6:
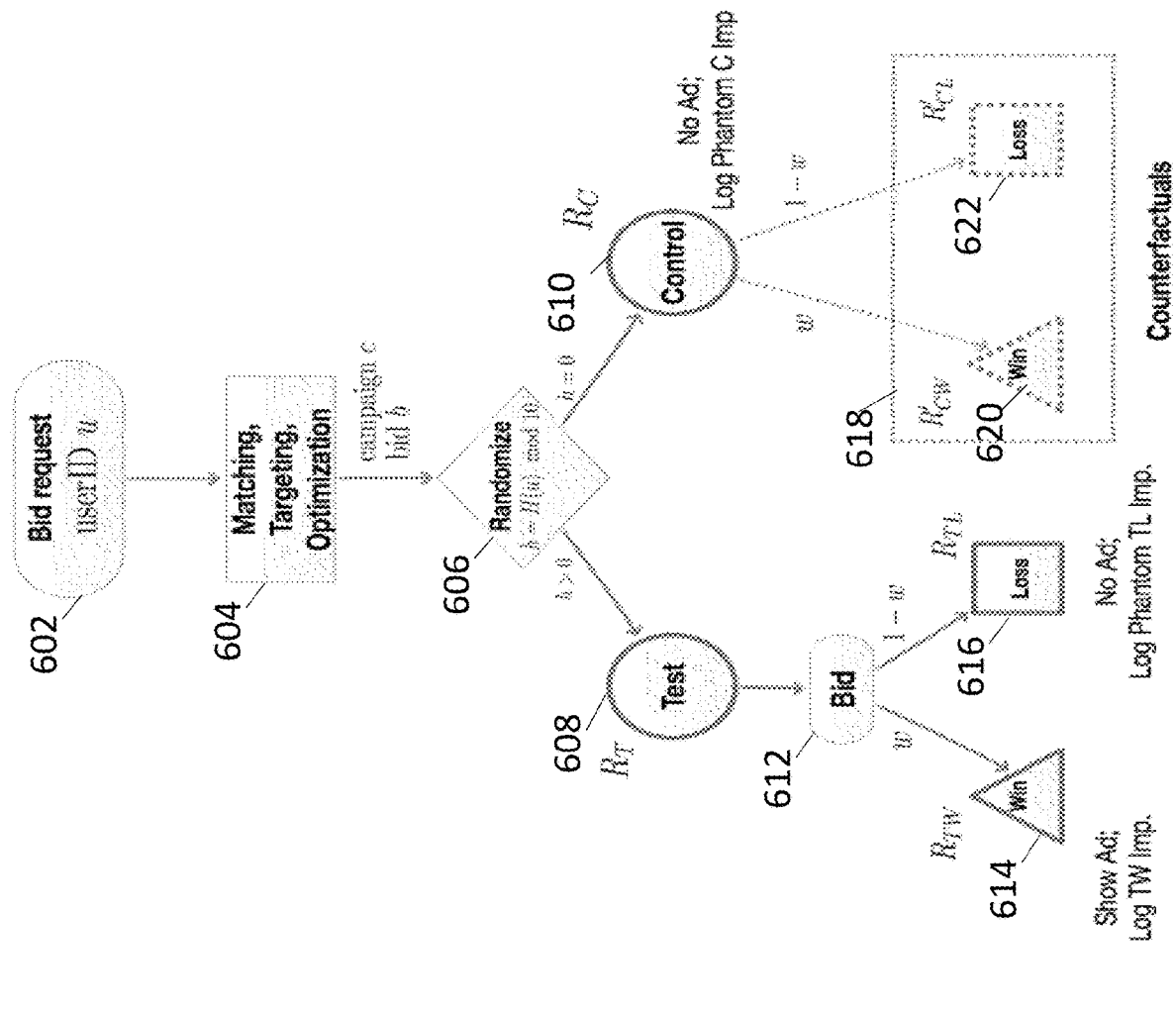
FIG. 6 is a block diagram depicting embodiments of a pre-bid randomization scheme.

FIG. 6 is a block diagram depicting embodiments of a pre-bid randomization scheme. The pre-bid randomization scheme can be used to estimate causal effects of ads. The shapes (circles, squares, and triangles) labeled Test, Control, Win, and Loss can indicate different populations of userIDs. The shapes are annotated with response rate variables.

At block 602, the ad exchange can send bid opportunities, or also called bid requests, along with associated data about the request to various DSPs, the DSPs associated with clients who are advertisers that compete to win the opportunity.

At block 604, the DSPs can receive these bid requests from the exchanges. The DSP can select the qualified advertisers based on various factors, such as advertisers' targeting requirements, the types of consumers they want to reach, the contexts in which they want to reach them, governing campaign criteria such as the available budget and desired frequency of exposure, and/or publisher restrictions on which types of advertisers they will accept. The DSP can conduct matching and/or targeting to arrive at a subset list of advertiser campaigns eligible to submit a bid.

In some embodiments, at block 606, a probability of bids are divided into two groups, the Test group and the Control group, with corresponding response rates, $R_T$ and $R_C$. The Test/Control group assignment of a userID u can be based on the last digit of H(u) where H is a uniform random hash function. Two populations can be represented by the same shape because they are statistically equivalent, meaning their response rates would be the same if their exposure status is the same.

At block 608, the DSP can submit the bids to the ad exchange for the Test group. Depending on the bids that the ad exchange receives, the bid can either win at block 614 or lose at block 616. The win rate (for example, the fraction of the Test population for which the submitted bids wins) can be denoted by w. In some embodiments, as illustrated, the triangles can correspond to winner types while the squares correspond to the loser types. For example, the response rates for the winners are $R_{TL}$ and $R'_{CL}$ are the same because they correspond to statistically equivalent loser type populations, and neither is exposed to ads.

The solid shapes can represent observable populations and corresponding response rates.

Because in this example, the Test and Control populations are statistically equivalent, w is also the expected fraction that would result in a win if bids were submitted for the Control population.

The two dotted shapes within the dotted box 618 can correspond to unobservable counterfactuals that have won at block 620 and lost at 622, whose response rates are $R'_{CW}$ and $R'_{CL}$, respectively. In some embodiments, the unobservable counterfactuals may not be directly measured because the Control group is not shown the advertisement. Accordingly, the unobservable counterfactuals may not be used to determine the incremental causality of the advertisement.

The pre-bid randomization can comprise four response rates:

$R_c=E[Y(0)]$; response rate assigned Control $R_{TW}=E[Y(1)|U=1]$; response rate of winner type assigned Test $R_{TL}=E[Y(1)|U=0]$; response rate of lower type assigned Test $R'_{CW}=E[Y(0)|U=1]$; counterfactual response rate winner type assigned Control $R'_{CL}=E[Y(0)|U=0]$; counterfactual response rate winner type assigned Control The individual causal effect under non-compliance ICE can be determined by subtracting the potential outcome of a userID $u_i$ if it were assigned to Test and the potential outcome if it were assigned to Control:

$ICE_i=Y_i(1)-Y_i(0)$

The Average Causal Effect under non-compliance ACE can be determined by:

$ACE=E_i[ICE_i]-E[Y(1)-Y(0)]=R_T-R_C$

The overall average response rate of the Test group comprising winner and loser types can be $R_T$. The overall average response rate of the Control group can be $R_C$.

The ATT under non-compliance can be determined by:

$ATT=E_i[ICE_i|U_i=1]$ $ATT=E_i[Y_i(1)-Y_i(0)|U_i=1]$ $ATT=R_{TW}-R'_{CW}$

The condition $U_i$ can indicate the winner types. This can be indicative of the population that would be exposed to ads if they were assigned to Test and the average response rate would be $E[Y(1)|U=1]$. Also, this population can be indicative of the population that is not exposed if assigned to control and the average response rate is $E[Y(0)|U=1]$. However, the latter term may not be observable. Nevertheless, ATT can be estimated.

Under pre-bid randomization, the average response rate of the loser type userIDs assigned to the Test and Control are the same:

$$E[Y(1)|U=0]=E[Y(0)|U=0]$$

$$R_{TL}=R'_{CL}$$

This can be because loser type userIDs are not exposed to ads whether they are assigned to the Test or Control group, and the Test/Control group assignment is purely random and hence ignorable. In other words, the assignment can have no influence on potential outcomes.

In the Test group, the userIDs with U=1 can be the group with W=1, so $E(U|Z=1)=E(W|Z=1)$, and the unbiased estimator of $E(W|Z=1)$ can be the fraction of Test userIDs that are exposed.

In pre-bid randomization scheme settings, the ATT can be the ratio between two observable averages:

$$ATT = ACE/P(U=1) = ACE/w = \frac{R_T - R_c}{w}$$

The win rate w can be:

$$E[Y(1)-Y(0)|U=1]=E\{Y(1)-Y(0)\}/P(U=1)$$

The Average Treatment Lift ATL, or the causal lift or ad lift, can indicate the change in response rate relative to the baseline unexposed response rate:

$$ATL=(R_{TW}-R'_{CW})/R'_{CW}$$

$$ATL=ATT/R'_{CW}$$

$$ATL=ATT/(R_{TW}-ATT)$$

The incrementality INC can indicate the fraction of the exposed Test response rate caused by the ad campaign:

$$INC=(R_{TW}-R'_{CW})/R_{TW}$$

$$INC=ATT/R_{TW}$$

The incrementality parameter can be used by a DSP to determine bids in the future. For example, if the DSP determines that the advertisement was not as effective as hoped, the DSP can bid the next bid request at a less price, whereas if the incremental causal effect was higher than estimated, the DSP can bid the next bid request at a higher price. The DSP can alter its bid decisions based on the estimated incremental effect of the bid.

Confidence Bounds and Intervals

Some embodiments of the present disclosure estimate a percentage confidence that an effect of an advertisement is between a confidence interval $(x_0, x_1)$. Some embodiments estimate the confidence bounds for ATT and ATL based on a Gibbs sampling scheme. Such embodiments can work with large and small samples, are relatively assumption-free, and may not rely on normal approximation.

A Markov-Chain Monte-Carlo (MCMC) sampling can be used. An example of MCMC is the Gibbs sampling scheme. MCMC techniques can be applicable when we have a Bayesian generative model of our data D, parameterized by some unknown parameter vector $\pi$, and random draws $\pi_0$, $\pi_1$, . . . can be generated from the joint posterior distribution of the parameters $\pi$ given the observed data. Such techniques can compute an expected (or average) value of a scalar function $f(\pi)$ with respect to the distribution of $\pi$. Such techniques can also compute an expected value of a scalar function $f(\pi)$, compute a range $[f_1, f_2]$ such that 90% of the probability mass of $f(\pi)$ lies between $f_1$ and $f_2$.

For some embodiments of the MCMC process, several iterations are drawn such that the next draw depends on the outcome of the preceding draw. The distribution of the draws $\pi$ can converge to the true posterior distribution of the parameters $\pi$ given the observed data D. This can enable accurate computation of averages and confidence-bounds. Gibbs Sampling can be used, where the parameter vector $\pi$ can be partitioned into $k \leq 2$ parts, and at each iteration, rather than generating the entire new vector $\pi$, each part is generated separately conditional on the latest values of all the other parts.

The observed data D can comprise counts of responders and non-responders among three populations TW, TL, C. In general, the number of responders and non-responders can be indicated by $X_1$ and $X_0$ respectively to comprise 6 observed counts: $TW_0$, $TW_1$, $TL_0$, $TL_1$, $C_0$, and $C_1$.

The four unobserved counts can be the number of responders and nonresponders in the counterfactual subsets CW, CL. CW can comprise the set of winner types in Control (for example, the set of Control userIDs who would have won if they were assigned to the Test). CL can comprise the set of loser types in the Control group. The four unobserved counts can comprise $CW_0$, $CW_1$, $CL_0$, $CL_1$:

$$CW_0+CL_0=CW_1+CL_1=C_1$$

The total number of winter-type userIDs can be:

$$N_w=CW_0+CW_1+TW_1+TW_0$$

The total number of loser-type userIDs can be:

$$N_L=CL_0+CL_1+TL_1+TL_0$$

The draw $N_w$ can be from a Binomial distribution with total trials $N_w+N_L$ and the probability of success as w:

$$N_w=\text{Binom}(N_w+N_L, w)$$

$$CW_1=\text{Binom}(CW_0+CW_1, R_{CW})$$

$$TW_1=\text{Binom}(TW_0+TW_1, R_{TW})$$

$$CL_1+TL_1=\text{Binom}(CL_0+TL_0+CL_1+TL_1, R_L)$$

$CW_1$ and $CL_1$ can add up to the observable count $C_1$. Thus, $CW_1$ can be obtained by the binomial draw from $C_1$ trials with success probability:

$$P(\text{winner-type} \mid \text{control responder}) = P(U=1 \mid Y(0)=1)$$
$$= P(U=1) \mid Y(0)=1)/P(Y(0)=1)$$
$$= \frac{P(U=1)P(Y(0)=1 \mid U=1)}{P(U=1)P(Y(0)=1 \mid U=1) + P(U=0)P(Y(0))=1 \mid U=0)}$$
$$= \frac{wR_{CW}}{wR_{CW}+(1-w)R_L}$$

Accordingly, $CL_0$ can be estimated by:

$$CW_1 = \text{Binom}\left(C_1, \frac{wR_{CW}}{wR_{CW} + (1-w)R_L}\right)$$

$$CL_1 = C_1 - CW_1$$

$$CW_0 = \text{Binom}\left(C_0, \frac{(1-w)R_L}{(1-w)R_L + wR_{CW}}\right)$$

Figure 7:
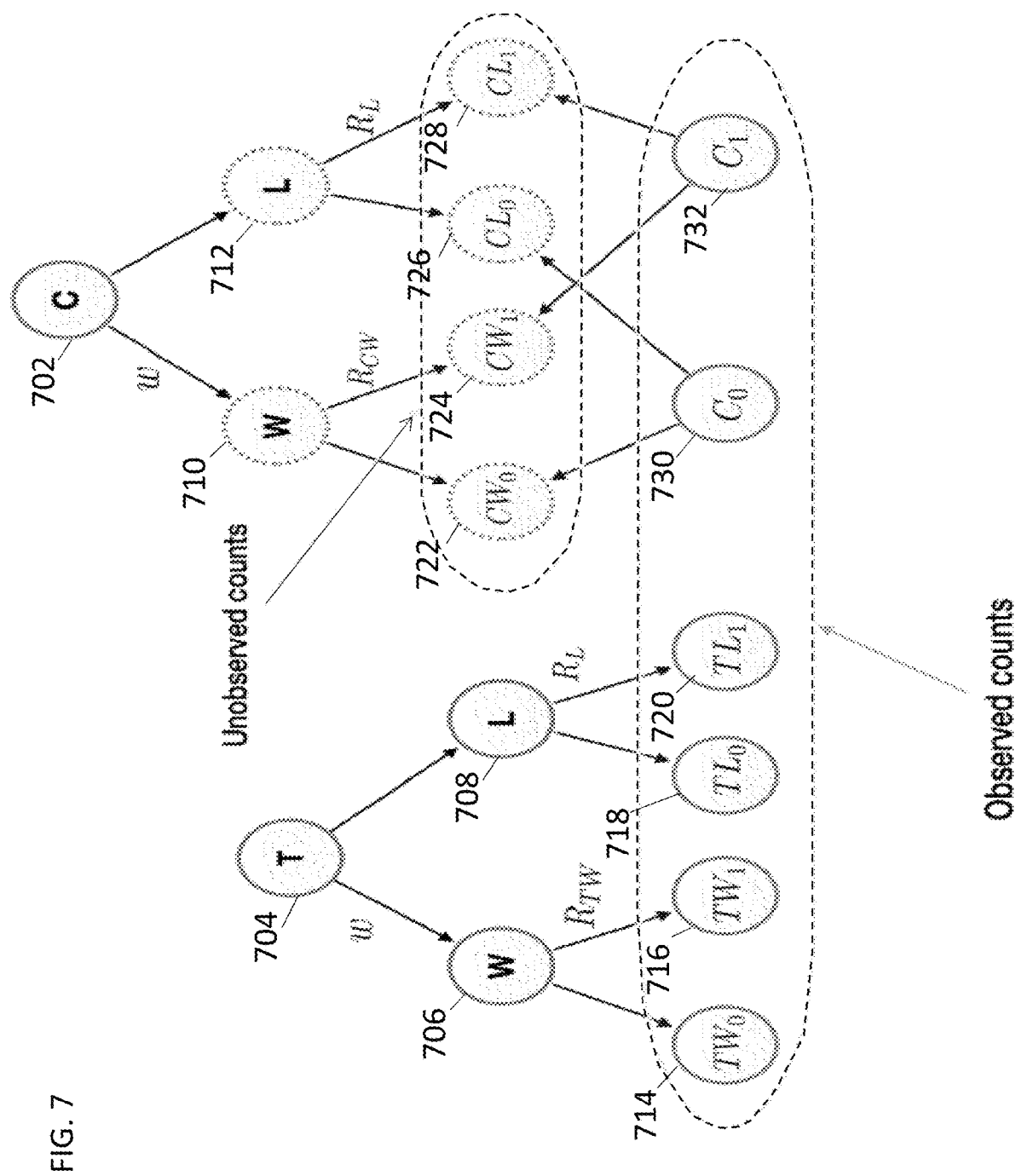
FIG. 7 is a block diagram depicting embodiments of random variables and observe counts in a Gibbs sampling procedure.

FIG. 7 is a block diagram depicting embodiments of random variables and observe counts in a Gibbs sampling procedure. The nodes labeled T, C at block 702 and 704 can indicate the Test and Control populations respectively. The W,L nodes at block 706, 708, 710, and 712 under the T,C nodes can indicate the winner type and loser type subpopulations. The other nodes at block 714, 716, 718, 720, 722, 724, 726, 728, 730, and 732 containing variables can indicate counts using a mnemonic notation for the population. The subscript 1 can indicate a conversion whereas 0 can indicate a non-conversion. For example, $TW_0$ at block 714 can indicate the number of non-converters among the Test-Win population.

Solid circles can indicate observable counts while dotted circles can indicate unobservable counts. Although the counts $CW_i$, $CL_i$ are not observable, the sum $CW_i + CL_i = C_i$ can be observable, since the total number of converters (for i=1) or non-converters (for i=0) can be in the Control group.

The arrows can be labeled by probability that an individual userID in the parent-node population falls in a sub-population represented by a child node. For example, the arrow from T to W is labeled w to illustrate that the probability that a Test group individual is a winner is w (the win rate) and the arrow from W to $TW_0$ is labeled $R_{TW}$ to indicate that the probability of an individual in the TW (Test-Winner) group converts can be $R_{TW}$, the Test-Winner response rate.

In some embodiments, a sampling process can be used. For example, the Gibbs sampling process can be used. To model minimal prior knowledge about posterior distributions of the parameters w, $R_{TW}$, $k_{CW}$, $R_L$, a Beta(1,1) prior can be used, which can be an equivalent to a uniform distribution over [0,1].

The Binomial likelihood of k successes out of n trials, with success probability p can be indicated by Lbin (k; n,p).

The Beta distribution can be a conjugate prior to the Binomial likelihood (for example, if the prior distribution on the probability p is a Beta($\alpha,\beta$) distribution, and the likelihood is a binomial likelihood Lbin (k; n,p), then the posterior of p can be a Beta distribution, specifically with parameters ($\alpha+k$, $\beta+n-k$):

$P(p|n,k)$ $\alpha$ Lbin($k;n,p$)Beta($\alpha,\beta$)

$\alpha$ Beta($\alpha+k,\beta+n-k$)

Thus, the equations that estimate the likelihood of the data given the respective parameter for the Binomial distributions are:

$w \sim \text{Beta}(1+CW_1+CW_0+TW_1+TW_0, 1+CL_1+CL_0+TL_1+TL_0)$ $R_{TW} \sim \text{Beta}(1+TW_1, 1+TW_0)$ $R_{CW} \sim \text{Beta}(1+CW_1, 1+CW_0)$ $R_L \sim \text{Beta}(1+CL_1+TL_1, 1+CL_0+TL_0)$ The vector of the four unknown probability parameters w, $R_{TW}$, $R_{CW}$, $R_L$, $\gamma$ can be indicated by $\pi$. The Gibbs sampling procedure can be used to iteratively generate a sequence of realizations of [$\pi,\gamma$] such that after some initial burn-in period (for example, 1000 iterations), these realizations can represent draws from a true joint distribution of [$\pi,\gamma$]. The sequence of realizations of [$\pi,\gamma$] can be denoted by [$\pi^0,\gamma^0$], [$\pi^1,\gamma^1$] . . . .

The $\pi$ and $\pi^0$ can be initialized using reasonable estimates from observed counts:

$w^0 = (TW_0 + TW_1)/(TW_0 + TW_1 + TL_0 + TL_1)$ $R_{TW}^0 = TW_1/(TW_0 + TW_1)$ $R_{CW}^0 = TW_1/(TW_0 + TW_1)$ $R_L^0 = TL_1/(TL_0 + TL_1)$

The observed Test-winners response rate can be used to initialize $R_{CW}$.

Next, the [$\pi,\gamma$] can be updated iteritively, where the i-th iteration (i=0, 1, 2, . . . ) can comprise of two steps.

The first step can be to generate $\gamma^{i+1}$ given $\pi^i$. For example, to generate the count $CW_1^{i+1}$, we can make a random draw from Binom($C_1$,p) where the success probability p is:

$w^i R_{CW}^i / [w^i R_{CW}^i + (1-w^i) R_L^i]$

The second step can be to generate $\pi^{i+1}$ given $\gamma^{i+1}$. For example, to generate, $R_{TW}^{i+1}$, a random draw can be taken from Beta($1+TW_1^{i+1}, 1+TW_0^{i+1}$).

Once a suitable number of "burn-in" interations N are passed, at each of the k subsequent iterations i=N+1, N+2 . . . N+k, we can calculate the metrics $ATT^i, ATL^i$, which are simple functions of the probability parameters $\pi^i$ at iteration i. N can be in the range of 1000, and K can be in the range of 2000.

In some embodiments, the 90% confidence bounds of ATT can be given the 5th and 95th percentiles of the collected values $ATT^i$, and similarly for the confidence bounds for ATL.

Solution to Recurring UserIDs

In some circumstances, a userID is used once in the logs data to measure Causal lift. However, there are circumstances where the userID can appear multiple times in the bid-request stream, as the consumer engages with different websites or mobile applications. Some embodiments of the present disclosure solve this technical problem of recurring userIDs in DSP technology.

To illustrate the problem with recurring userIDs, if each bid opportunity for a given userID was a distinct unit and they are all different userIDs, a bid opportunity can be in TW if the bid opportunity results in a win and a TL otherwise. This can be problematic because if an individual consumer appeared with a certain userID u in a won bid opportunity at time t (and hence was exposed to the ad campaign), then reappeared in a lost bid opportunity with to same userID u at time t+δ, this consumer can still be under the influence of the ad exposure from time t. This can mean that the potential outcomes Y(0), Y(1) subsequent to the second bid opportunity could not be those that one would expect from an unexposed consumer.

In some embodiments, if the gap of time 6 between the first and second bid opportunities is smaller, it is likely that the "if-unexposed potential outcome" Y(0) can be similar to Y(1). In other words, regardless of whether the second bid opportunity results in a win or loss, the two potential outcomes can be similar.

Some embodiments of the present disclosure solve this technical problem of recurring userIDs by treating the userID itself as a unit, meaning that each unit now represents the set of all bid opportunities given to a particular userID. Units can correspond to individual consumers who can each be the subject of multiple bid opportunities. This can remove the interference between units, if each distinct userID corresponds to a distinct consumer. This is also advantageous to advertisers as advertisers are looking to assess causal effects on their customers and potential customers, rather than individual bid opportunities.

Some embodiments of the present disclosure determine how a userID u is considered to be a Test-winner if at least one of the bid opportunities involving u is a win. Otherwise, the userID u can be considered a Test-loser.

Some embodiments of the present disclosure check whether a bid opportunity by, for a given userID u, checking if there is a bid opportunity for u within the campaign-designated post-view (PV) window prior to the conversion event. The response $Y_u$ of the userID can be defined as the total number of conversions attributable to u.

The potential outcomes ($Y_u(0)$ and $Y_u(1)$) and the various response rates mentioned above can be extended to the case of recurring userIDs. For example, the response rate $R_{TW}=E[Y(1)|U=1]$ can be the total number of conversions attributed to Test-winner userIDs. Thus, ATT and ATL can be determined.

Solution to userID Contamination

In some circumstances, a userID is associated with a browser and/or a device. For example, a userID can be associated with a browser cookie. A browser cookie can comprise data generated by code on a website, exchanged between the website and the browser, and/or can be used to identify the individual instance of the web browser being used on a particular device.

Cookies can be periodically deleted either automatically or manually by the user. Thus, cookies may not necessarily persist across different observations of the same user, such that a given consumer could appear with distinct userIDs on different bid opportunities. For example, in pre-bid randomization, this can result in some of the consumerIDs assigned to the Test and others in the Control group, which can be referred to as cookie contamination.

Furthermore, some browsers may not accept cookies by default. Thus, a system where userIDs are associated with a browser cookie would not be able to identify a browsing instance.

Certain studies have shown that cookie-based measurement can systematically underestimate the true underlying "person-level" treatment effect, and further show that, under reasonable assumptions, the attenuation factor equals the average number of cookies per user, which some estimate to be at least 3, and others as high as 6 or 7. Thus, cookie contamination can significantly reduce the signal-to-noise ratio in Ad Lift measurements.

Another type of userID can be a mobile advertising ID (for example, the Apple IDFA or Google Android ID), which can be used to identify a mobile device of a consumer. Mobile advertising IDs may be stable and persist over time, and can identify a particular device, whereas a cookie may not persist and identifies an instance of a browser on a device. Consumers are increasingly using multiple connected devices (for example, phones, tablets, watches). Thus, while a device has a unique and persistent mobile advertising ID, a consumer can still be associated with a plurality of mobile advertising IDs. The bid opportunities on different mobile devices owned by the same consumer can have different mobile advertising IDs and thus different userIDs. This can lead to some userIDs for a given consumer assigned to both the Test and Control group, which can be referred to as cross-device contamination.

Both cookie contamination and/or cross-device contamination can lead to a form of dilution in the measured lift, whereby the measured userID-level lift can understate the true consumer-level lift. For example, if each consumer has k devices, and each device is assigned to Control with a probability p, and all Test devices can be exposed to ads, the true consumer-level causal Ad Lift can be represented by a, and the device level can be:

$$ATL = \alpha p^{k-1}/(1+\alpha-\alpha p^{k-1})$$

Two types of consumers can be identified, where type-C can refer those with all k devices in the Control group, and type-T where at least one device is in the Test group. Since a Test device can be exposed to an ad, the userID-level randomized assignment can result in a random assignment to type-T and type-C at the consumer level, with the probability of assignment to type-C being $p^k$. The type-T consumer can have a conversion probability of $r_t$ and the conversion probability for each device can be $r_t/k$. The type-C consumer can have a conversion probability of $r_c$ and the conversion probability for each device can be $r_c/k$. The true consumer-level lift is a, and thus:

$$r_t = r_c(1+\alpha)$$

Then, in the scenario where each consumer has k devices, each device is assigned to Control group with a probability of p, all Test devices can be exposed to ads, and the true consumer-level causal Ad Lift is a, the lift measured at the device can be measured by:

$$ATL = \alpha p^{k-1}/(1+\alpha+\alpha p^{k-1})$$

Figure 8:
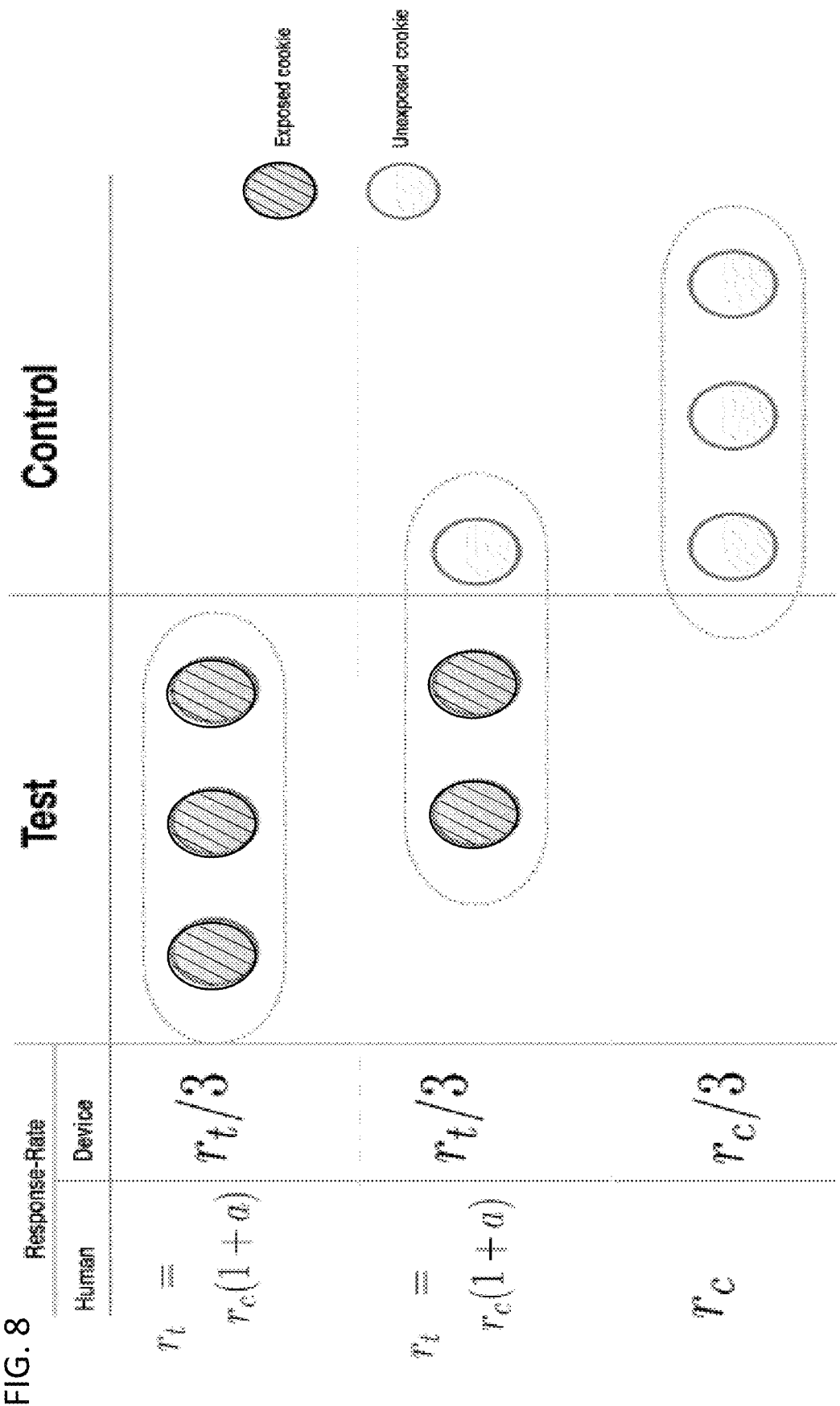
FIG. 8 is a block diagram depicting embodiments of a cross-device contamination scenario where each consumer is associated with three devices.

FIG. 8 is a block diagram depicting embodiments of a cross-device contamination scenario where each consumer is associated with three devices. Each device is represented by a circle. Each device can be randomly assigned to Control group with a probability of p, and the Test group with a probability of (1−p). The device distributions of three consumers are shown. Each row of devices can be associated with a distinct consumer, and that of each device of the consumer. The dark circles can represent devices that are exposed to a cookie and white circles represent devices that are not exposed to a cookie.

The response rates of the Test and Control group can be represented by $R_t$, $R_c$, respectively at the device level. Test devices can be a type-T consumer and can have a conversion probability:

$$R_t = r_t/k$$

The conversion probability of a Control device can depend on whether or not it is contaminated, in other words, whether a device that belongs to the same consumer is in the Test group.

The measured Control device response rate can be:

$$R_c = \frac{p^{k-1}r_c}{k} + (1-p^{k-1})r_t/k$$

$$R_c = \frac{p^{k-1}r_c}{k} + (1-p^{k-1})r_c(1+a)/k$$

$$R_c = (1+a-ap^{k-1})r_c/k$$

Thus, the lift can be determined by:

$$ATT=(R_t-R_c)/R_c$$

$$ATT=\alpha p^{k-1}/(1+\alpha-\alpha p^{k-1})$$

As the number of devices per consumer k increases, the measured device-level lift can drop exponentially in k.

Some embodiments of the present disclosure use an integrated userID, or a Connected-ID, to solve this technical challenge. The integrated userID can connect various userIDs (for example, cookie IDs, mobile advertising IDs, etc) associated with a particular consumer. The integrated userID can connect to other userIDs via personal information of the consumer, such as an email address used to log into accounts on websites or mobile applications.

Some embodiments of the present disclosure discard userIDs for which there is no integrated userID mapping. In other words, an integrated userID without mapping can be because login ID information has not been captured for that consumer and joined to the integrated userID graph, because the device is new, etc. For the remaining userIDs, the integrated userID can be used instead of the userID. Doing so can provide a causal lift measurement at the integrated userID level (or consumer level).

Employing a large quantity of userIDs to the use of integrated userID can reduce the effect of abnormalities, such as if integrated userID is incomplete or incorrect in certain circumstances. The integrated userID solution can comprise supervised testing against known deterministic IDs, unsupervised testing to flag and filter abnormalities, (for example, abnormally high numbers of userIDs mapping to a single integrated userID), performance validation (i.e., looking at actual business results derived from the application of integrated userID solutions to marketing activities), and other methods.

In some embodiments, a confidence factor is tied to the number of userIDs. For example, the higher the value of the number of devices k, the more confidence the integrated userID solution's ability to associate userIDs to the consumer.

FIG. 9 is a table depicting embodiments of causal lift measurement results along with various related computations and intermediate values over seven campaigns. The ID of an ad campaign is id. The Average Treatment Effect on the Treated is ATT. The Causal Lift is ATL. The incrementality is INC.

The columns starting with "g" denote quantities related to the Gibbs-sampling methodology. For example, g5, g50, g95 denote the $5^{th}$, $50^{th}$, and $95^{th}$ percentile, respectively of the distribution of possible values of ATL that are consistent with the observed data. Thus, the range (g5, g95) can be the 90% confidence-interval for ATL. gConf is the directional confidence in the observed lift, which models the distribution of ATL as a gaussian with mean pt and standard-deviation a computed from the generated values of ATL, and then gConf can be one minus the probability that the ATL would have been observed as high as the one observed, had the true value of ATL been negative, under the assumed Gaussian distribution.

The 6 columns, TU, TC, TWU, TWC, CU, CC represent the raw observed counts that are the inputs to the system. TU, TC are the number of unique integrated userIDs and conversions in the Test group, respectively. TWU, TWC are the number of unique integrated userIDs and conversions in the Test-Win population. CU, CC are the number of unique integrated userIDs and conversions in the Control group.

w is the win rate, which can be defined as TWU/TU, expressed as a percentage. $R_T$, $R_C$ are observed response rates of the Test and Control group populations, expressed as percentages:

$$R_T=TC/TU$$

$$R_C=CC/CU$$

The response rate of the Test-Winners group is $R_{TW}$, equal to TWC/TWU, expressed as a percentage.

In this example, six raw observed counts with values of TU=263, 501; TC=1,670; TWU=140,058; TWC=955, CU=16,065; CC=79 were measured.

$$R_T = \frac{TC}{TU} = \frac{1670}{263501} = 0.0063\% = 63\ bp$$

$$R_C = \frac{CC}{CU} = \frac{70}{16065} = 0.0049\% = 49\ bp$$

$$R_{TW} = \frac{TWC}{TWU} = \frac{955}{148058} = 0.0065\% = 65\ bp$$

$$w = \frac{TWU}{TU} = 56\%$$

$$ACE = R_T - R_C = 63 - 49\ bp = 14\ bp$$

$$ATT = \frac{ACE}{w} = \frac{14\ bp}{0.56} = 25\ bp = (R_{TW} - R_{CW})$$

$$ATL = \frac{ATT}{R_{CW}} = \frac{25}{40} = 63\%$$

$$INC = \frac{ATT}{R_{TW}} = \frac{25}{65} = 39\%$$

Accordingly, the response rate of the exposed Test population was 63% higher than that of the counterfactual Control winner population. Out of the 65 bp response rate of the exposed Test population, 39% was causally attributable to the ad campaign.

Looking across the 7 ad campaigns, the ATL and INC vary widely. The values of ATL and INC were positive and the values of gConf were above 90% for all but one campaign, illustrating the utility of providing point estimates and confidence measures.

Figure 10:
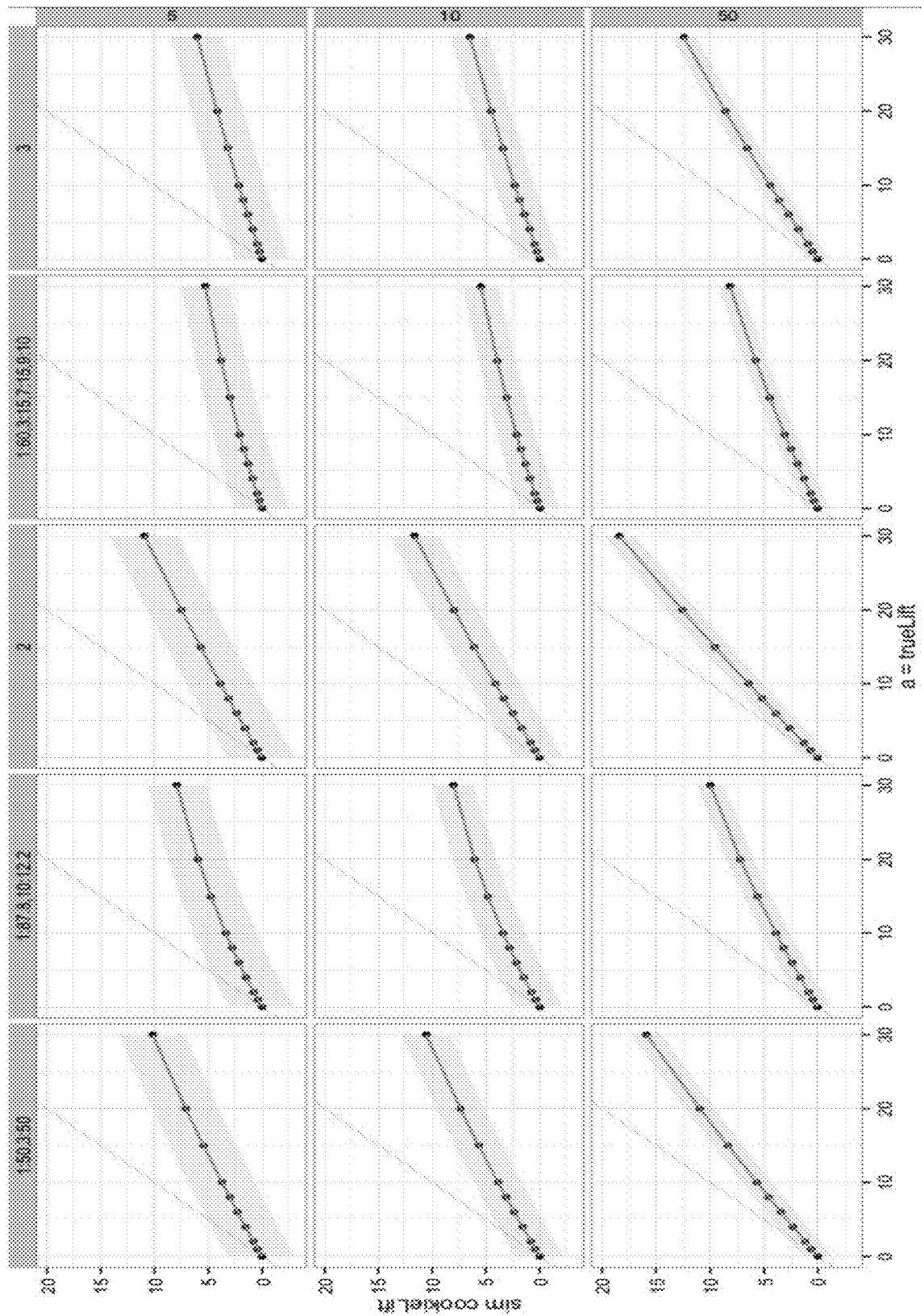
FIG. 10 is a set of graphs depicting embodiments of simulations for cookie contamination.

FIG. 10 is a set of graphs depicting embodiments of simulations for cookie contamination.

Applications

The estimation of Ad Lift can be applied to multiple campaigns taking into account interaction effects. The digital ad-buying platform can specify how such ad lift measurements correctly inform advertising budget allocation decisions. The digital ad-buying platform can unify the randomization approach for valuation of individual bid opportunities in a manner that accounts for incrementality at the bid-opportunity level. For example in a scenario with two ad campaigns running simultaneously, the ad lift of a campaign can be estimated in isolation by finding a population exposed only to one of the ad campaigns. Then, the ad lift for the other ad campaign can be estimated in isolation by finding a population exposed only to the second ad campaign. Then, based on the ad lift of each individually, the overall response rate as a function of individual campaign response rates can be solved. In some embodiments, linear algebra can be used to solve these response rates. For example, for N channels of campaigns, the determination of lift can occur recursively. First, individual lift estimates can be obtained. Then, the lift estimates can be solved for two by two, two people, two lift campaigns. Next, the expression can be solved for three by three, and so forth.

In some embodiments, the individual lift estimates from individual campaigns can be used to determine ad campaign budgets. Accordingly, simultaneous campaigns can be determined to be more effective than individual lift estimates and thus, an advertiser can increase budgets on the two campaigns and reduce budgets on others with less synergistic effect.

In some embodiments, the DSP can receive a budget from an advertiser and/or characteristics of the target audience. The DSP can use the ad causal lift impact estimate to automatically place bids according to the budget and target audience.

In some embodiments, machine learning models can be used to calculate incrementality on an impression level. Neural networks can be trained and implemented to identify predictive models for incrementality. In some embodiments, the determination of the causal effect (for example, the ATT, ATL, INC) can be used to redirect a customer to a network resource, such as a webpage for a product sale or a mobile function, such that the consumer is retargeted to a particular direction. For example, based on the efficacy of the advertisement, the user can be directed to a website advertising a pair of shoes in a separate browsing session. The efficacy of the advertisement can be used to generate a bid submission for the same user in a future bid for a higher bid price if the efficacy was higher than expected.

Based on the efficacy, the link associated with the advertisement can change. For example, if the efficacy was high and if the bid was won and the advertisement shown to the user, in response to a user selection of the advertisement, a website with the product and other related products can be shown. In some embodiments, if the efficacy was low and if the bid was won and the associated advertisement was shown to the user, in response to a user selection of the advertisement, a website with the product and other non-related products can be shown.

Upon determination of causal impact of an advertisement, an advertiser can use the causal impact information to change the nature of future bids. For example, the advertisers can submit higher bid amounts for that target audience group, submit bids for larger advertisement space, submit bids more frequently for that target audience group, and the like.

In some embodiments, the ad causal impact can be determined for a particular consumer (for example by using an email address or a consumer ID), for a particular browsing session (for example by using cookie data), for a particular user device (for example by using user device ID), for a group of related identifiers (for example by using a domain name associated with an email address), or for a bid type. As such, an advertiser can adjust future bids to a particular consumer, a particular browsing session, a particular user device, a group of related identifiers, or for a bid type.

The ad causal impact can be determined for a particular advertiser (for example by an advertiser ID). The ad causal impact can be used by the DSP to provide a recommendation to the advertiser. If a particular bid had high efficacy for one advertiser, the DSP can provide a recommendation to other advertisers based on the bid of the advertiser with high efficacy. If one advertiser is submitting bids, several with high causal ad impact and others with low causal ad impact, the DSP can perform analysis to determine similar characteristics among the bids that had high or low causal ad impact to provide a recommendation to the advertiser to improve the efficacy of the advertisements. For example, if the advertiser is consistently bidding too low for a particular demographic of people (for example, as compared to other advertisers), then the DSP can suggest to increase the bid amount for that particular demographic.

In some embodiments, the ad causal impact can be automatically used by the DSP. The DSP can use the ad causal impact to automatically adjust characteristics of bids for an advertiser. The advertiser can request that the DSP take automatic action to increase overall bid amounts or bid amounts for particular bid opportunities that share similar characteristics to ones assessed by the DSP for ad causal impact. For example, if particular bid opportunities with high ad causal impact are directed to female teenagers for a particular line of products, the DSP can receive preauthorization to increase the bid amount for this demographic when bidding for advertisement space and submit advertisements that are related to the line of products.

The system can follow the consumer as the consumer navigates the interface, such as a browser or mobile application. In some embodiments, the system can perform prospecting on customers based on causal effect and internet characteristics, such as search terms used.

In some embodiments, the system can use a plurality of methods, such as the prospecting and the retargeting methods described above. In such a system, an aggregate incrementality can be determined For purposes of this application, certain aspects, advantages, and novel features of the invention are described herein. It is to be understood that not necessarily all such advantages can be achieved in accordance with any particular embodiment of the invention. Thus, for example, those skilled in the art will recognize that the invention can be embodied or carried out in a manner that achieves one advantage or group of advantages as taught herein without necessarily achieving other advantages as can be taught or suggested herein.

Although several embodiments, examples, and illustrations are disclosed herein, it will be understood by those of ordinary skill in the art that the inventions described herein extend beyond the specifically disclosed embodiments, examples, and illustrations and comprises other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments can be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "can," unless specifically stated otherwise, or otherwise understood within the context as used, is generally intended to convey that certain embodiments comprise, while other embodiments do not comprise, certain features, elements and/or steps. Thus, such conditional language is not generally intended to imply that features, elements and/or steps are in any way required for one or more embodiments or that one or more embodiments necessarily comprise logic for deciding, with or without user input or prompting, whether these features, elements and/or steps are comprised or are to be performed in any particular embodiment. The headings used herein are for the convenience of the reader only and are not meant to limit the scope of the inventions or claims.

What is claimed is:

1. A computer-implemented method for determining one or more bids for an ad impression opportunity based on a causal ad impact of one or more previous bids, the method comprising:
   receiving, by a computer system, a first bid request for a first ad impression opportunity;
   identifying, by the computer system, one or more advertisers to submit a bid in response to the first bid request to place one or more advertisements on user computing systems of a plurality of users;
   executing, by the computer system, a randomization scheme, whereby each of the plurality of users is categorized in one of a control group or a test group;
   logging, by the computer system, a control impression for the control group, wherein the one or more advertisements is not transmitted to user computing systems of the control group;
   submitting, by the computer system, one or more bids for placing the one or more advertisements on user computing systems of the test group;
   receiving, by the computer system, results of the one or more submitted bids, wherein the results indicate whether each of the one or more submitted bids was won or lost;
   logging, by the computer system, a test-win impression for a first sub-group of the test group, wherein at least one of the one or more advertisements is transmitted to user computing systems of the first sub-group;
   logging, by the computer system, a test-lost impression for a second sub-group, wherein the one or more advertisements is not transmitted to user computing systems of the second sub-group;
   accessing, by the computer system, data associated with the control group, the first sub-group, and the second sub-group;
   identifying, by the computer system, actions associated with the control group, the first sub-group, and the second sub-group by utilizing the accessed data;
   determining, by the computer system, the causal ad impact based at least in part on the identified actions associated with the control group, the first sub-group, and the second sub-group;
   analyzing, by the computer system using a machine learning model, the determined causal ad impact by determining the relative efficacy of the one or more submitted bids and determining similarities in characteristics between the one or more submitted bids having similar causal ad impact;
   providing, by the computer system, based on the analysis of the determined causal ad impact, one or more recommendations to the one or more advertisers related to submission of one or more bids in response to a second bid request for a second ad impression opportunity; and
   adjusting, based on the provided one or more recommendations, the one or more bids in response to the second bid request for the second ad impression opportunity,
   wherein the computer system comprises a computer processor and an electronic storage medium.

2. The computer-implemented method of claim 1, wherein each of the plurality of users is categorized as the control group or the test group based on a fraction probability.

3. The computer-implemented method of claim 1, wherein the method further comprises:
   identifying, by the computer system, one or more consumer responses based on the actions associated with the control group, the first sub-group, and the second sub-group,
   wherein determining the causal ad impact is further based at least in part on the one or more consumer responses.

4. The computer-implemented method of claim 3, wherein the one or more consumer responses comprises one or more of: a site visit, a registration, a subscription, an addition of items to a shopping cart, or a purchase.

5. The computer-implemented method of claim 1, wherein the computer system comprises a demand side platform.

6. The computer-implemented method of claim 1, wherein the method further comprises:
   determining, by the computer system, a confidence factor for the causal ad impact, wherein the confidence factor comprises an interval and/or a value range associated with a probability percentile.

7. The computer-implemented method of claim 6, wherein the confidence factor is determined based at least in part on Markov-Chain Monte-Carlo sampling.

8. The computer-implemented method of claim 7, wherein the Markov-Chain Monte-Carlo sampling comprises a Gibbs sampling scheme.

9. A system for determining one or more bids for an ad impression based on a causal ad impact of one or more previous bids, wherein the system comprises:
   one or more computer readable storage devices configured to store a plurality of computer executable instructions; and
   one or more hardware computer processors in communication with the one or more computer readable storage devices and configured to execute the plurality of computer executable instructions in order to cause the system to:
      receive a first bid request for a first ad impression opportunity;
      identify one or more advertisers to submit a bid in response to the first bid request to place one or more advertisements on user computing systems of a plurality of users;
      execute a randomization scheme, whereby each of the plurality of users is categorized in one of a control group or a test group;

log a control impression for the control group, wherein the one or more advertisements is not transmitted to user computing systems of the control group;

submit one or more bids for placing the one or more advertisements on user computing systems of the test group;

receive results of the one or more submitted bids, wherein the results indicate whether each of the one or more submitted bids was won or lost;

log a test-win impression for a first sub-group of the test group, wherein at least one of the one or more advertisements is transmitted to user computing systems of the first sub-group;

log a test-lost impression for a second sub-group, wherein the one or more advertisements is not transmitted to user computing systems of the second sub-group;

access data associated with the control group, the first sub-group, and the second sub-group;

identify actions associated with the control group the first sub-group, and the second sub-group by utilizing the accessed data;

determine the causal ad impact based at least in part on the identified actions associated with the control group, the first sub-group, and the second sub-group;

analyze, using a machine learning model, the determined causal ad impact by determining the relative efficacy of the one or more submitted bids and determining similarities in characteristics between the one or more submitted bids having similar causal ad impact;

provide, based on the analysis of the determined causal ad impact, one or more recommendations to the one or more advertisers related to submission of one or more bids in response to a second bid request for a second ad impression opportunity; and adjust, based the provided one or more recommendations, the one or more bids in response to the second bid request for the second ad impression opportunity.

10. The system of claim 9, wherein a general advertisement not associated with the one or more advertisements is transmitted to user computing systems of the control group.

11. The system of claim 9, wherein to determine the causal ad impact the logs of the control impression and the test-win impression are taken over a predetermined time period.

12. The system of claim 9, wherein the randomization scheme is executed by categorizing each of the plurality of users in the control group or the test group using a hash function.

13. The system of claim 9, wherein the one or more advertisers are identified based on at least one or more of: targeting requirements, types of consumers, targeting contexts, governing campaign criteria, available budget, desired frequency of exposure, or publisher restrictions on types of advertisers.

14. A computer-implemented method for determining one or more bids for an ad impression opportunity based on a causal ad impact of one or more previous bids, the method comprising:

receiving, by a computer system, a first bid request for a first ad impression opportunity;

identifying, by the computer system, one or more advertisers to submit a bid in response to the first bid request to place one or more advertisements on user computing systems of a plurality of users;

submitting, by the computer system, one or more bids for placing the one or more advertisements on user computing systems of the plurality of users;

receiving, by the computer system, results of the one or more submitted bids, wherein the results indicate whether each of the one or more bids was won or lost;

executing, by the computer system, a randomization scheme, whereby each of the plurality of users is categorized in one of a control group or a test group;

logging, by the computer system, a test group impression for the test group, wherein at least one of the one or more advertisements is transmitted to user computing systems of the test group;

logging, by the computer system, a control group impression for the control group, wherein the one or more advertisements is not transmitted to user computing systems of the control group;

accessing, by the computer system, data associated with the test group and the control group;

identifying, by the computer system, actions associated with the test group and the control group by utilizing the accessed data;

determining, by the computer system, the causal ad impact based at least in part on the identified actions associated with the test group and the control group;

analyzing, by the computer system using a machine learning model, the determined causal ad impact by determining the relative efficacy of the one or more submitted bids and determining similarities in characteristics between the one or more submitted bids having similar causal ad impact;

providing, by the computer system, based on the analysis of the determined causal ad impact, one or more recommendations to the one or more advertisers related to submission of one or more bids in response to a second bid request for a second ad impression opportunity; and adjusting, based on the determined causal ad impact and the provided one or more recommendations, the one or more bids in response to the second bid request for the second ad impression opportunity;

wherein the computer system comprises a computer processor and an electronic storage medium.

15. The computer-implemented method of claim 14, wherein one or more integrated identifiers are used to determine the causal ad impact, wherein each of the one or more integrated identifiers is associated with a particular user.

16. The computer-implemented method of claim 15, wherein over a million users are assessed to create the one or more integrated identifiers.

17. The computer-implemented method of claim 15, further comprising:

determining, by the computer system, a confidence factor for the causal ad impact, wherein the confidence factor is based on a number of total users assessed to create the integrated identifiers.

18. The computer-implemented method of claim 14, wherein the computer system comprises a demand side platform.

19. The computer-implemented method of claim 14, wherein the randomization scheme is executed using a hash function.

20. The computer-implemented method of claim 14, wherein the randomization scheme is executed subsequent to submitting the one or more bids.

* * * * *